(12) United States Patent
Chen et al.

(10) Patent No.: US 10,627,600 B2
(45) Date of Patent: Apr. 21, 2020

(54) IMAGING OPTICAL LENS SYSTEM, IMAGE CAPTURING UNIT AND ELECTRONIC DEVICE

(71) Applicant: LARGAN PRECISION CO., LTD., Taichung (TW)

(72) Inventors: Hung-Shuo Chen, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 156 days.

(21) Appl. No.: 15/870,806

(22) Filed: Jan. 12, 2018

(65) Prior Publication Data
US 2019/0196144 A1  Jun. 27, 2019

(30) Foreign Application Priority Data
Dec. 22, 2017  (TW) .............................. 106145184 A

(51) Int. Cl.
*G02B 9/60*  (2006.01)
*G02B 9/64*  (2006.01)
*G02B 27/00*  (2006.01)
*G02B 13/00*  (2006.01)

(52) U.S. Cl.
CPC .......... *G02B 9/64* (2013.01); *G02B 27/0025* (2013.01); *G02B 13/0045* (2013.01)

(58) Field of Classification Search
CPC ... G02B 9/64; G02B 27/0025; G02B 13/0045
See application file for complete search history.

(56) References Cited

U.S. PATENT DOCUMENTS

| | | | |
|---|---|---|---|
| 7,880,981 | B2 | 2/2011 | Do |
| 9,366,847 | B2 | 6/2016 | Chen |
| 2012/0099210 | A1 | 4/2012 | Huang et al. |
| 2015/0070783 | A1 | 3/2015 | Hashimoto |
| 2016/0025953 | A1* | 1/2016 | Jung ................... H04N 5/2254 348/360 |

(Continued)

FOREIGN PATENT DOCUMENTS

| | | |
|---|---|---|
| CN | 101421658 A | 4/2009 |
| CN | 105044884 A | 11/2015 |

(Continued)

OTHER PUBLICATIONS

TW Office Action in application No. 106145184 dated Sep. 12, 2018.

*Primary Examiner* — Joseph P Martinez
(74) *Attorney, Agent, or Firm* — Maschoff Brennan

(57) ABSTRACT

An imaging optical lens system includes seven lens elements which are, in order from an object side to an image side: a first lens element, a second lens element, a third lens element, a fourth lens element, a fifth lens element, a sixth lens element and a seventh lens element. Each of the seven lens elements has an object-side surface facing toward the object side and an image-side surface facing toward the image side. The object-side surface of the first lens element is convex in a paraxial region thereof. The second lens element has positive refractive power. The third lens element has negative refractive power. At least one surface among the object-side surfaces and the image-side surfaces of the seven lens elements has at least one critical point in an off-axis region thereof.

15 Claims, 25 Drawing Sheets

(56) References Cited

U.S. PATENT DOCUMENTS

| | | |
|---|---|---|
| 2016/0231533 A1 | 8/2016 | Mercado |
| 2016/0377841 A1 | 12/2016 | Kubota et al. |
| 2017/0068072 A1 | 3/2017 | Hashimoto |
| 2018/0196226 A1 | 7/2018 | Chang et al. |
| 2018/0196235 A1 | 7/2018 | Chang et al. |
| 2018/0364457 A1 | 12/2018 | Yao et al. |

FOREIGN PATENT DOCUMENTS

| | | |
|---|---|---|
| CN | 106842512 A | 6/2017 |
| CN | 106990510 A | 7/2017 |
| CN | 107015346 A | 8/2017 |
| CN | 107015347 A | 8/2017 |
| CN | 107102425 A | 8/2017 |
| CN | 107153257 A | 9/2017 |
| CN | 107300751 A | 10/2017 |
| CN | 107479172 A | 12/2017 |
| CN | 107664819 A | 2/2018 |
| CN | 107664827 A | 2/2018 |
| CN | 107664828 A | 2/2018 |
| CN | 107664829 A | 2/2018 |
| CN | 107678130 A | 2/2018 |
| CN | 107678143 A | 2/2018 |
| CN | 107797230 A | 3/2018 |
| CN | 107797240 A | 3/2018 |
| CN | 107797250 A | 3/2018 |
| CN | 107797251 A | 3/2018 |
| CN | 107797256 A | 3/2018 |
| CN | 107797257 A | 3/2018 |
| CN | 107861221 A | 3/2018 |
| CN | 107861224 A | 3/2018 |
| CN | 107907970 A | 4/2018 |
| CN | 107918187 A | 4/2018 |
| CN | 107918193 A | 4/2018 |
| CN | 107918197 A | 4/2018 |
| CN | 107942485 A | 4/2018 |
| CN | 107942488 A | 4/2018 |
| CN | 107966788 A | 4/2018 |
| CN | 107966790 A | 4/2018 |
| CN | 107976774 A | 5/2018 |
| CN | 107976775 A | 5/2018 |
| CN | 107976776 A | 5/2018 |
| CN | 107976781 A | 5/2018 |
| CN | 107976782 A | 5/2018 |
| CN | 107976783 A | 5/2018 |
| CN | 107991757 A | 5/2018 |
| CN | 107991758 A | 5/2018 |
| CN | 108051903 A | 5/2018 |
| CN | 108089291 A | 5/2018 |
| CN | 108089292 A | 5/2018 |
| CN | 108089294 A | 5/2018 |
| CN | 108089295 A | 5/2018 |
| CN | 108089296 A | 5/2018 |
| CN | 108089300 A | 5/2018 |
| CN | 108089301 A | 5/2018 |
| CN | 108089302 A | 5/2018 |
| CN | 108089303 A | 5/2018 |
| CN | 108132515 A | 6/2018 |
| CN | 108132517 A | 6/2018 |
| CN | 108132522 A | 6/2018 |
| CN | 108152918 A | 6/2018 |
| CN | 108152919 A | 6/2018 |
| CN | 108152920 A | 6/2018 |
| CN | 108169873 A | 6/2018 |
| CN | 108227119 A | 6/2018 |
| CN | 108227120 A | 6/2018 |
| CN | 108227122 A | 6/2018 |
| CN | 108227124 A | 6/2018 |
| CN | 108227126 A | 6/2018 |
| CN | 108227130 A | 6/2018 |
| CN | 108227131 A | 6/2018 |
| CN | 108227132 A | 6/2018 |
| CN | 108227134 A | 6/2018 |
| CN | 108254860 A | 7/2018 |
| CN | 108254861 A | 7/2018 |
| CN | 108254862 A | 7/2018 |
| CN | 108254864 A | 7/2018 |
| CN | 108254865 A | 7/2018 |
| CN | 108254868 A | 7/2018 |
| CN | 108254869 A | 7/2018 |
| CN | 108254870 A | 7/2018 |
| CN | 108254884 A | 7/2018 |
| CN | 108254887 A | 7/2018 |
| JP | 2012-002906 A | 1/2012 |
| JP | 2015-072402 A | 4/2015 |
| JP | 2015-072405 A | 4/2015 |
| JP | 2015-203792 A | 11/2015 |
| TW | 201606345 A | 2/2016 |

\* cited by examiner

IMAGING OPTICAL LENS SYSTEM, IMAGE CAPTURING UNIT AND ELECTRONIC DEVICE

RELATED APPLICATIONS

This application claims priority to Taiwan Application 106145184, filed on Dec. 22, 2017, which is incorporated by reference herein in its entirety.

BACKGROUND

Technical Field

The present disclosure relates to an imaging optical lens system, an image capturing unit and an electronic device, more particularly to an imaging optical lens system and an image capturing unit applicable to an electronic device.

Description of Related Art

With the development of semiconductor manufacturing technology, the performance of image sensors has been improved, and the pixel size thereof has been scaled down. Therefore, featuring high image quality is one of the indispensable features of an optical system nowadays.

Furthermore, with the rapid changes in technology, electronic devices equipped with optical systems are developed towards multi-functionality for various applications, and therefore the functionality requirements for the optical systems have been increasing. However, it is difficult for a conventional optical system to obtain a balance among the requirements such as high image quality, low sensitivity, desirable size of the aperture, miniaturization or required field of view. Accordingly, the present disclosure provides an optical system satisfying the aforementioned requirements.

SUMMARY

According to one aspect of the present disclosure, an imaging optical lens system includes seven lens elements. The seven lens elements are, in order from an object side to an image side, a first lens element, a second lens element, a third lens element, a fourth lens element, a fifth lens element, a sixth lens element and a seventh lens element. Each of the seven lens elements has an object-side surface facing toward the object side and an image-side surface facing toward the image side. The object-side surface of the first lens element is convex in a paraxial region thereof. The second lens element has positive refractive power. The third lens element has negative refractive power. At least one surface among the object-side surfaces and the image-side surfaces of the seven lens elements has at least one critical point in an off-axis region thereof. When an Abbe number of the first lens element is V1, an Abbe number of the fourth lens element is V4, a curvature radius of the object-side surface of the second lens element is R3, a curvature radius of the image-side surface of the second lens element is R4, a focal length of the first lens element is f1, and a focal length of the second lens element is f2, the following conditions are satisfied:

$1.20 < V1/V4 < 5.50;$ $0 < (R3+R4)/(R3-R4);$ and $|f2/f1| < 3.00.$

According to another aspect of the present disclosure, an image capturing unit includes the aforementioned imaging optical lens system and an image sensor, wherein the image sensor is disposed on an image surface of the imaging optical lens system.

According to still another aspect of the present disclosure, an electronic device includes the aforementioned image capturing unit.

According to yet another aspect of the present disclosure, an imaging optical lens system includes seven lens elements. The seven lens elements are, in order from an object side to an image side, a first lens element, a second lens element, a third lens element, a fourth lens element, a fifth lens element, a sixth lens element and a seventh lens element. Each of the seven lens elements has an object-side surface facing toward the object side and an image-side surface facing toward the image side. The image-side surface of the second lens element is convex in a paraxial region thereof. The third lens element has negative refractive power. The object-side surface of the fifth lens element is concave in a paraxial region thereof. The object-side surface of the seventh lens element is convex in a paraxial region thereof. At least one surface among the object-side surfaces and the image-side surfaces of the seven lens elements has at least one critical point in an off-axis region thereof. When an Abbe number of the first lens element is V1, an Abbe number of the fourth lens element is V4, a focal length of the third lens element is f3, and a focal length of the fifth lens element is f5, the following conditions are satisfied:

$1.10 < V1/V4 < 6.50;$ and $|f5/f3| < 0.80.$

According to yet still another aspect of the present disclosure, an imaging optical lens system includes seven lens elements. The seven lens elements are, in order from an object side to an image side, a first lens element, a second lens element, a third lens element, a fourth lens element, a fifth lens element, a sixth lens element and a seventh lens element. Each of the seven lens elements has an object-side surface facing toward the object side and an image-side surface facing toward the image side. The image-side surface of the second lens element is convex in a paraxial region thereof. The object-side surface of the fifth lens element is concave in a paraxial region thereof. The object-side surface of the seventh lens element is convex in a paraxial region thereof. At least one surface among the object-side surfaces and the image-side surfaces of the seven lens elements has at least one critical point in an off-axis region thereof. When a curvature radius of the object-side surface of the second lens element is R3, a curvature radius of the image-side surface of the second lens element is R4, a curvature radius of the object-side surface of the fifth lens element is R9, and a curvature radius of the image-side surface of the fifth lens element is R10, the following conditions are satisfied:

$-0.50 < (R3+R4)/(R3-R4);$ and $1.85 < |R9/R10|.$

BRIEF DESCRIPTION OF THE DRAWINGS

The disclosure can be better understood by reading the following detailed description of the embodiments, with reference made to the accompanying drawings as follows.

DETAILED DESCRIPTION

An imaging optical lens system includes seven lens elements. The seven lens elements are, in order from an object side to an image side, a first lens element, a second lens element, a third lens element, a fourth lens element, a fifth lens element, a sixth lens element and a seventh lens element.

The first lens element can have an object-side surface being convex in a paraxial region thereof. Therefore, it is favorable for reducing an incident angle of light on the first lens element so as to prevent surface reflection.

The second lens element can have positive refractive power; therefore, it is favorable for enhancing light convergence capability so as to reduce a total track length and broaden a field of view of the imaging optical lens system. The second lens element can have an image-side surface being convex in a paraxial region thereof; therefore, it is favorable for reducing an emergent angle of light with large angle of view on the second lens element so as to prevent surface reflection, and thereby increase illuminance on the image surface and prevent stray light for obtaining a wide-angle configuration.

Figure 25:
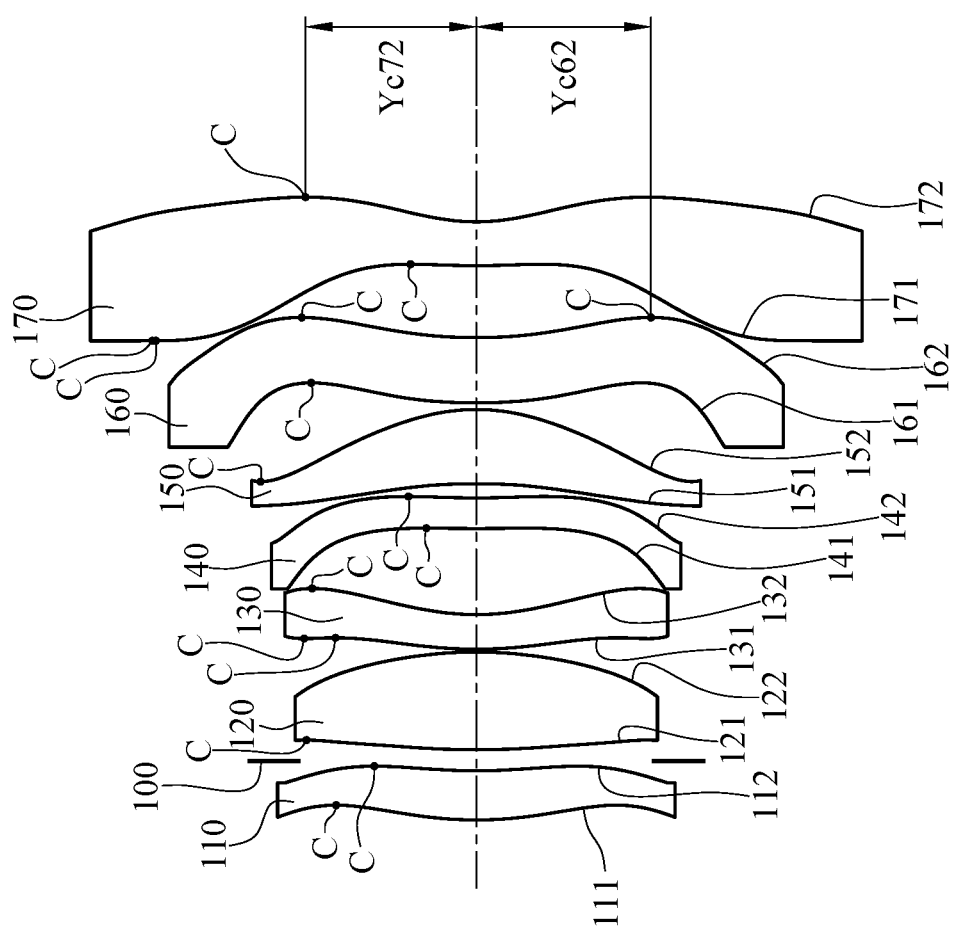
FIG. 25 shows a schematic view of Yc62, Yc72 and critical points of the seven lens elements according to the 1st embodiment of the present disclosure.

The third lens element can have negative refractive power; therefore, it is favorable for correcting aberrations generated by short total track length and large field of view. The third lens element can have an image-side surface being concave in a paraxial region thereof; therefore, it is favorable for correcting astigmatism. The image-side surface of the third lens element can have at least one critical point in an off-axis region thereof; therefore, it is favorable for correcting off-axis field curvature. Please refer to FIG. 25, which shows a schematic view of critical points C of the seven lens elements according to the 1st embodiment of the present disclosure, wherein the image-side surface of the third lens element has at least one critical point C.

The fifth lens element can have an object-side surface being concave in a paraxial region thereof; therefore, it is favorable for reducing the incident angle of peripheral light rays so as to prevent surface reflection, increase illuminance on the image surface, and prevent stray light. The fifth lens element can have positive refractive power; therefore, it is favorable for balancing the positive refractive power of the imaging optical lens system so as to correct aberrations and reduce the sensitivity. The fifth lens element can have an image-side surface being convex in a paraxial region thereof; therefore, it is favorable for adjusting the traveling direction of peripheral light rays so as to increase an imaging range and the image brightness.

An image-side surface of the sixth lens element can have at least one critical point in an off-axis region thereof. Therefore, it is favorable for adjusting the incident angle and emergent angle of peripheral light rays so as to maintain a small diameter of the sixth lens element, thereby minimizing the size of the imaging optical lens system.

The seventh lens element can have an object-side surface being convex in a paraxial region thereof; therefore, it is favorable for correcting aberrations such as distortion. The seventh lens element can have negative refractive power; therefore, it is favorable for balancing the refractive power distribution on the image side of the imaging optical lens system so as to correct aberrations, and reducing a back focal length so as to achieve miniaturization. The seventh lens element can have an image-side surface being concave in a paraxial region thereof; therefore, it is favorable or reducing the back focal length and thereby reducing the total track length of the imaging optical lens system. The image-side surface of the seventh lens element can have at least one critical point in an off-axis region thereof; therefore, it is favorable for adjusting the emergent angle of peripheral light rays so as to reduce the incident angle of peripheral light rays on the image surface, thereby improving the response efficiency of an image sensor.

At least one surface among object-side surfaces and image-side surfaces of the first lens element, the second lens element, the third lens element, the fourth lens element, the fifth lens element, the sixth lens element and the seventh lens element of the imaging optical lens system can have at least one critical point in an off-axis region thereof; therefore, it is favorable for correcting off-axis aberrations and adjusting the incident angle and emergent angle of peripheral light rays so as to prevent surface reflection and increase illuminance on the image surface, thereby eliminating vignetting and stray light. Preferably, at least one surface among the object-side surfaces and the image-side surfaces of the fifth lens element, the sixth lens element and the seventh lens element can have at least one critical point in an off-axis region thereof. More preferably, at least one surface among the object-side surfaces and the image-side surfaces of the sixth lens element and the seventh lens element can have at least one critical point in an off-axis region thereof. Please refer to FIG. 25, which shows a schematic view of critical points C of the seven lens elements according to the 1st embodiment of the present disclosure.

When an Abbe number of the first lens element is V1, and an Abbe number of the fourth lens element is V4, the following condition can be satisfied: 1.10<V1/V4<6.50. Therefore, proper material selection of the first lens element and the fourth lens element is favorable for correcting chromatic aberration so as to reduce colour cast. Preferably, the following condition can be satisfied: 1.20<V1/V4<5.50. More preferably, the following condition can be satisfied: 1.45<V1/V4<5.00. Much more preferably, the following condition can also be satisfied: 1.55<V1/V4<4.50.

When a curvature radius of the object-side surface of the second lens element is R3, and a curvature radius of the image-side surface of the second lens element is R4, the following condition can be satisfied: −0.65<(R3+R4)/(R3−R4). Therefore, adjusting a shape of the second lens element is favorable for reducing the total track length and broadening the field of view. Preferably, the following condition can be satisfied: −0.50<(R3+R4)/(R3−R4). More preferably, the following condition can be satisfied: −0.15<(R3+R4)/(R3−R4). Much more preferably, the following condition can be satisfied: 0<(R3+R4)/(R3−R4). Still much more preferably, the following condition can be satisfied: 0<(R3+R4)/(R3−R4)<4.8. Yet still much more preferably, the following condition can also be satisfied: 0<(R3+R4)/(R3−R4)<3.0.

When a focal length of the first lens element is f1, and a focal length of the second lens element is f2, the following condition can be satisfied: |f2/f1|<3.00. Therefore, it is favorable for balancing the refractive power distribution on the first lens element and the second lens element so as to reduce spherical aberration. Preferably, the following condition can be satisfied: |f2/f1|<1.50. More preferably, the following condition can also be satisfied: |f2/f1|<0.80.

When a focal length of the third lens element is f3, and a focal length of the fifth lens element is f5, the following condition can be satisfied: |f5/f3|<0.80. Therefore, it is favorable for adjusting the refractive power distribution on the object side and the image side of the imaging optical lens system so as to prevent the refractive power of the third lens element from being overly strong, and thereby reduce the sensitivity and the total track length.

When a curvature radius of the object-side surface of the fifth lens element is R9, and a curvature radius of the image-side surface of the fifth lens element is R10, the following condition can be satisfied: 1.25<|R9/R10|. Therefore, it is favorable for adjusting a shape of the fifth lens element so as to change the traveling direction of peripheral light rays, thereby increasing the imaging range and illuminance on the peripheral region of the image surface to improve image quality. Preferably, the following condition can be satisfied: 1.50<|R9/R10|. More preferably, the following condition can be satisfied: 1.85<|R9/R10|. Much more preferably, the following condition can also be satisfied: 2.00<|R9/R10|.

When an Abbe number of the third lens element is V3, and the Abbe number of the fourth lens element is V4, the following condition can be satisfied: 10.0<V3+V4<65.0. Therefore, it is favorable for the third lens element and the fourth lens element to work with each other so as to correct chromatic aberration.

When a central thickness of the second lens element is CT2, and a central thickness of the seventh lens element is CT7, the following condition can be satisfied: 0<CT7/CT2<1.20. Therefore, it is favorable for preventing the seventh lens element from being overly thick, thereby obtaining short total track length; moreover, it is favorable for preventing the second lens element from being overly thin, thereby increasing the manufacturing yield; furthermore, it is favorable for balancing the refractive power distribution on the object side and the image side of the imaging optical lens system.

When a focal length of the imaging optical lens system is f, and a curvature radius of the image-side surface of the fourth lens element is R8, the following condition can be satisfied: 0≤f/R8. Therefore, adjusting a shape of the fourth lens element is favorable for correcting astigmatism.

When the focal length of the third lens element is f3, and a focal length of the fourth lens element is f4, the following condition can be satisfied: 0≤f3/f4<1.0. Therefore, adjusting a ratio of the refractive power of the third lens element to the refractive power of the fourth lens element is favorable for minimizing the size of the imaging optical lens system.

When an axial distance between the object-side surface of the first lens element and an image surface is TL, the following condition can be satisfied: 1.0 [mm]<TL<7.0 [mm]. Therefore, it is favorable for keeping the imaging optical lens system in compact size for various applications.

When the axial distance between the object-side surface of the first lens element and the image surface is TL, and an entrance pupil diameter of the imaging optical lens system is EPD, the following condition can be satisfied: 0.8<TL/EPD<2.6. Therefore, it is favorable for obtaining a balance between large size of the aperture and compactness of the imaging optical lens system.

When half of a maximum field of view of the imaging optical lens system is HFOV, the following condition can be satisfied: 25.0 [deg.]<HFOV<75.0 [deg.]. Therefore, it is favorable for preventing the field of view from being overly large or overly small, thereby ensuring the imaging optical lens system in compact size. Preferably, the following condition can also be satisfied: 30.0 [deg.]<HFOV<65.0 [deg.].

When a vertical distance between a critical point on the image-side surface of the sixth lens element and an optical axis is Yc62, and a vertical distance between a critical point on the image-side surface of the seventh lens element and the optical axis is Yc72, the following condition can be satisfied: 0<Yc62/Yc72<2.0. Therefore, adjusting the shapes of the sixth lens element and the seventh lens element is favorable for the sixth lens element and the seventh lens element to work with each other so as to correct off-axis aberrations and reduce the size of the imaging optical lens system. Please refer to FIG. 25, which shows a schematic view of Yc62 and Yc72 according to the 1st embodiment of the present disclosure.

When the focal length of the imaging optical lens system is f, and a focal length of the seventh lens element is f7, the following condition can be satisfied: $-1.35<f/f7<-0.75$. Therefore, it is favorable for obtaining a proper back focal length of the imaging optical lens system.

When a central thickness of the first lens element is CT1, and an axial distance between the first lens element and the second lens element is T12, the following condition can be satisfied: $0<CT1/T12<3.5$. Therefore, adjusting the lens thicknesses of the first lens element and the second lens element and the axial distance therebetween is favorable for the design of wide-angle configuration.

When the axial distance between the object-side surface of the first lens element and the image surface is TL, and a maximum image height of the imaging optical lens system (half of a diagonal length of an effective photosensitive area of an image sensor) is ImgH, the following condition can be satisfied: $0.8<TL/ImgH\le 1.6$. Therefore, it is favorable for obtaining a balance between enlarging image surface area and reducing the total track length.

When an axial distance between the object-side surface of the first lens element and the image-side surface of the seventh lens element is TD, an axial distance between the third lens element and the fourth lens element is T34, and an axial distance between the sixth lens element and the seventh lens element is T67, the following condition can be satisfied: $0<TD/(T34+T67)<10.0$. Therefore, adjusting the axial distances between each two adjacent lens elements in a proper ratio is favorable for reducing the total track length of the imaging optical lens system.

When the focal length of the imaging optical lens system is f, and a curvature radius of the image-side surface of the seventh lens element is R14, the following condition can be satisfied: $0.60<f/R14<8.0$. Therefore, adjusting the shape of the seventh lens element is favorable for correcting off-axis aberrations.

When the focal length of the imaging optical lens system is f, a curvature radius of the object-side surface of the first lens element is R1, the following condition can be satisfied: $-1.0<f/R1<1.5$. Therefore, adjusting a shape of the first lens element is favorable for correcting aberrations such as spherical aberration while enlarging the field of view.

When a focal length of the sixth lens element is f6, and the focal length of the seventh lens element is f7, the following condition can be satisfied: $0\le f7/f6$. Therefore, it is favorable for the sixth lens element and the seventh lens element to work with each other so as to correct aberrations and reduce the total track length.

When the focal length of the second lens element is f2, and the focal length of the fifth lens element is f5, the following condition can be satisfied: $0<f5/f2<1.24$. Therefore, it is favorable for balancing the refractive power distribution on the object side and the image side of the imaging optical lens system so as to reduce the size of the imaging optical lens system and the sensitivity.

When an f-number of the imaging optical lens system is Fno, the following condition can be satisfied: $1.0<Fno<2.0$. Therefore, it is favorable for providing sufficient and proper illuminance on the image surface.

According to the present disclosure, the aforementioned features and conditions can be utilized in numerous combinations so as to achieve corresponding effects.

According to the present disclosure, the lens elements of the imaging optical lens system can be made of either glass or plastic material. When the lens elements are made of glass material, the refractive power distribution of the imaging optical lens system may be more flexible. The glass lens element can either be made by grinding or molding. When the lens elements are made of plastic material, the manufacturing cost can be effectively reduced. Furthermore, surfaces of each lens element can be arranged to be aspheric, which allows for more controllable variables for eliminating the aberration thereof, the required number of the lens elements can be decreased, and the total track length of the imaging optical lens system can be effectively reduced. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, a critical point is a non-axial point of the lens surface where its tangent is perpendicular to the optical axis.

According to the present disclosure, an image surface of the imaging optical lens system, based on the corresponding image sensor, can be flat or curved, especially a curved surface being concave facing towards the object side of the imaging optical lens system.

According to the present disclosure, an image correction unit, such as a field flattener, can be optionally disposed between the lens element closest to the image side of the imaging optical lens system and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the imaging optical lens system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging optical lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging optical lens system and thereby provides a wider field of view for the same.

According to the above description of the present disclosure, the following specific embodiments are provided for further explanation.

1st Embodiment

Figure 1:
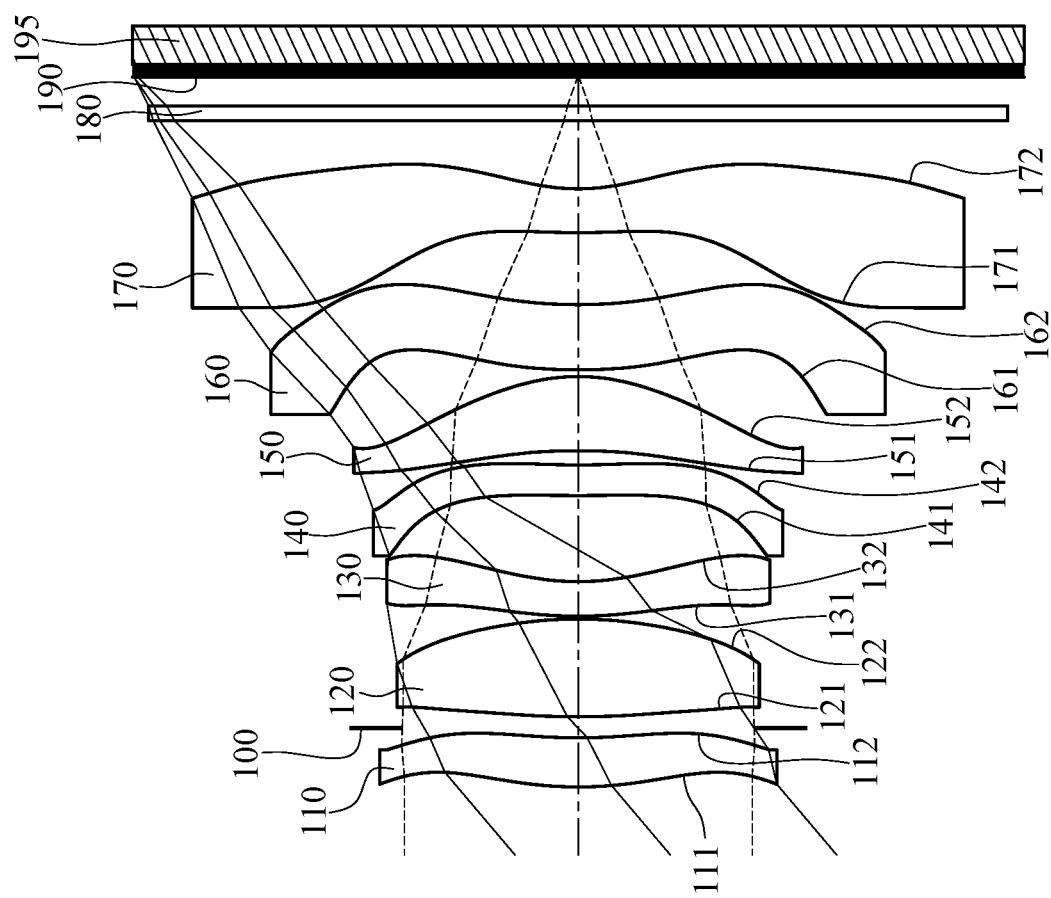
FIG. 1 is a schematic view of an image capturing unit according to the 1st embodiment of the present disclosure.
Figure 2:
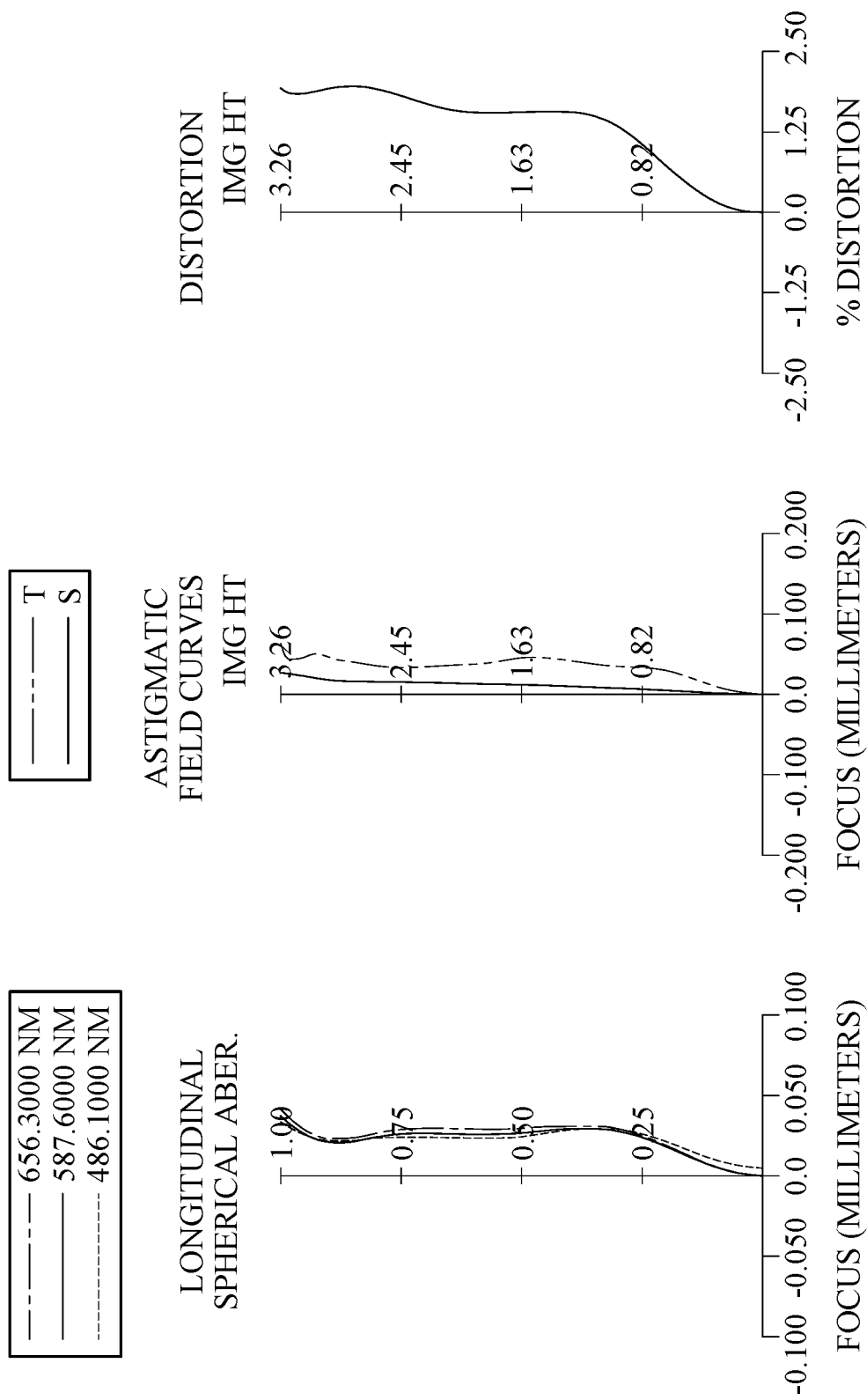
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the imaging optical lens system (its reference numeral is omitted) of the present disclosure and an image sensor 195. The imaging optical lens system includes, in order from an object side to an image side, a first lens element 110, an aperture stop 100, a second lens element 120, a third lens element 130, a fourth lens element 140, a fifth lens element 150, a sixth lens element 160, a seventh lens element 170, a filter 180 and an image surface 190. The imaging optical lens system includes seven lens elements (110, 120, 130, 140, 150, 160 and 170) with no additional lens element disposed between each of the adjacent seven lens elements.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric. Each of the object-side surface 111 and the image-side surface 112 of the first lens element 110 has at least one critical point in an off-axis region thereof.

The second lens element 120 with positive refractive power has an object-side surface 121 being convex in a paraxial region thereof and an image-side surface 122 being convex in a paraxial region thereof. The second lens element 120 is made of glass material and has the object-side surface 121 and the image-side surface 122 being both aspheric. The object-side surface 121 of the second lens element 120 has at least one critical point in an off-axis region thereof.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. Each of the object-side surface 131 and the image-side surface 132 of the third lens element 130 has at least one critical point in an off-axis region thereof.

The fourth lens element 140 with negative refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. Each of the object-side surface 141 and the image-side surface 142 of the fourth lens element 140 has at least one critical point in an off-axis region thereof.

The fifth lens element 150 with positive refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric. The image-side surface 152 of the fifth lens element 150 has at least one critical point in an off-axis region thereof.

The sixth lens element 160 with negative refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. Each of the object-side surface 161 and the image-side surface 162 of the sixth lens element 160 has at least one critical point in an off-axis region thereof.

The seventh lens element 170 with negative refractive power has an object-side surface 171 being convex in a paraxial region thereof and an image-side surface 172 being concave in a paraxial region thereof. The seventh lens element 170 is made of plastic material and has the object-side surface 171 and the image-side surface 172 being both aspheric. Each of the object-side surface 171 and the image-side surface 172 of the seventh lens element 170 has at least one critical point in an off-axis region thereof.

The filter 180 is made of glass material and located between the seventh lens element 170 and the image surface 190, and will not affect the focal length of the imaging optical lens system. The image sensor 195 is disposed on or near the image surface 190 of the imaging optical lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the imaging optical lens system of the image capturing unit according to the 1st embodiment, when a focal length of the imaging optical lens system is f, an f-number of the imaging optical lens system is Fno, and half of a maximum field of view of the imaging optical lens system is HFOV, these parameters have the following values: f=3.75 millimeters (mm), Fno=1.47, HFOV=40.3 degrees (deg.).

When an Abbe number of the first lens element 110 is V1, and an Abbe number of the fourth lens element 140 is V4, the following condition is satisfied: V1/V4=3.00.

When an Abbe number of the third lens element 130 is V3, and the Abbe number of the fourth lens element 140 is V4, the following condition is satisfied: V3+V4=39.1.

When a central thickness of the first lens element 110 is CT1, and an axial distance between the first lens element 110 and the second lens element 120 is T12, the following condition is satisfied: CT1/T12=2.35. In this embodiment, an axial distance between two adjacent lens elements is an air gap in a paraxial region between the two adjacent lens elements.

When a central thickness of the second lens element 120 is CT2, and a central thickness of the seventh lens element 170 is CT7, the following condition is satisfied: CT7/CT2=0.45.

When an axial distance between the object-side surface 111 of the first lens element 110 and the image-side surface 172 of the seventh lens element 170 is TD, an axial distance between the third lens element 130 and the fourth lens element 140 is T34, and an axial distance between the sixth lens element 160 and the seventh lens element 170 is T67, the following condition is satisfied: TD/(T34+T67)=3.78.

When an axial distance between the object-side surface 111 of the first lens element 110 and the image surface 190 is TL, the following condition is satisfied: TL=5.22 [mm].

When the axial distance between the object-side surface 111 of the first lens element 110 and the image surface 190 is TL, and an entrance pupil diameter of the imaging optical lens system is EPD, the following condition is satisfied: TL/EPD=2.04.

When the axial distance between the object-side surface 111 of the first lens element 110 and the image surface 190 is TL, and a maximum image height of the imaging optical lens system is ImgH, the following condition is satisfied: TL/ImgH=1.60.

When the focal length of the imaging optical lens system is f, and a curvature radius of the object-side surface 111 of the first lens element 110 is R1, the following condition is satisfied: f/R1=1.37.

When the focal length of the imaging optical lens system is f, and a curvature radius of the image-side surface 142 of the fourth lens element 140 is R8, the following condition is satisfied: f/R8=0.70.

When the focal length of the imaging optical lens system is f, and a curvature radius of the image-side surface 172 of the seventh lens element 170 is R14, the following condition is satisfied: f/R14=2.59.

When a curvature radius of the object-side surface 121 of the second lens element 120 is R3, and a curvature radius of the image-side surface 122 of the second lens element 120 is R4, the following condition is satisfied: (R3+R4)/(R3−R4)=0.35.

When a curvature radius of the object-side surface 151 of the fifth lens element 150 is R9, and a curvature radius of the image-side surface 152 of the fifth lens element 150 is R10, the following condition is satisfied: |R9/R10|=3.84.

When the focal length of the imaging optical lens system is f, and a focal length of the seventh lens element 170 is f7, the following condition is satisfied: f/f7=−1.01.

When a focal length of the first lens element 110 is f1, and a focal length of the second lens element 120 is f2, the following condition is satisfied: |f2/f1|=0.32.

When a focal length of the third lens element 130 is f3, and a focal length of the fourth lens element 140 is f4, the following condition is satisfied: f3/f4=0.52.

When the focal length of the second lens element 120 is f2, and a focal length of the fifth lens element 150 is f5, the following condition is satisfied: f5/f2=0.85.

When the focal length of the third lens element 130 is f3, and the focal length of the fifth lens element 150 is f5, the following condition is satisfied: |f5/f3|=0.48.

When a focal length of the sixth lens element 160 is f6, and the focal length of the seventh lens element 170 is f7, the following condition is satisfied: f7/f6=0.09.

When a vertical distance between a critical point on the image-side surface 162 of the sixth lens element 160 and an optical axis is Yc62, and a vertical distance between a critical point on the image-side surface 172 of the seventh lens element 170 and the optical axis is Yc72, the following condition is satisfied: Yc62/Yc72=1.02.

The detailed optical data of the 1st embodiment are shown in Table 1 and the aspheric surface data are shown in Table 2 below.

TABLE 1

1st Embodiment
f = 3.75 mm, Fno = 1.47, HFOV = 40.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.741 (ASP) | 0.362 | Plastic | 1.545 | 56.1 | 12.77 |
| 2 | | 4.311 (ASP) | 0.070 | | | | |
| 3 | Ape. Stop | Plano | 0.084 | | | | |
| 4 | Lens 2 | 5.839 (ASP) | 0.719 | Glass | 1.486 | 85.2 | 4.04 |
| 5 | | −2.833 (ASP) | 0.020 | | | | |
| 6 | Lens 3 | 3.076 (ASP) | 0.254 | Plastic | 1.660 | 20.4 | −7.16 |
| 7 | | 1.802 (ASP) | 0.633 | | | | |
| 8 | Lens 4 | 12.523 (ASP) | 0.225 | Plastic | 1.688 | 18.7 | −13.84 |
| 9 | | 5.368 (ASP) | 0.104 | | | | |
| 10 | Lens 5 | −5.416 (ASP) | 0.546 | Plastic | 1.529 | 45.4 | 3.44 |
| 11 | | −1.409 (ASP) | 0.049 | | | | |
| 12 | Lens 6 | 4.602 (ASP) | 0.479 | Plastic | 1.544 | 56.0 | −43.56 |
| 13 | | 3.712 (ASP) | 0.529 | | | | |
| 14 | Lens 7 | 5.553 (ASP) | 0.322 | Plastic | 1.544 | 56.0 | −3.72 |
| 15 | | 1.452 (ASP) | 0.500 | | | | |
| 16 | Filter | Plano | 0.110 | Glass | 1.517 | 64.2 | — |
| 17 | | Plano | 0.212 | | | | |
| 18 | Image | Plano | — | | | | |

Note:
Reference wavelength is 587.6 nm (d-line).
An effective radius of the image-side surface 122 (Surface 5) is 1.330 mm.

TABLE 2

Aspheric Coefficients

| Surface # | 1 | 2 | 4 | 5 | 6 |
|---|---|---|---|---|---|
| k = | −3.3278E+00 | −3.8810E+01 | 1.6168E+01 | −2.7797E+01 | 2.4691E+00 |
| A4 = | −3.8604E−02 | −2.1847E−02 | −3.1467E−02 | −4.3293E−02 | −1.0342E−01 |
| A6 = | −8.0354E−03 | −1.1098E−01 | −6.0814E−02 | −2.6689E−02 | 3.2631E−02 |
| A8 = | −3.4423E−02 | 8.8827E−02 | 7.0796E−02 | 6.7670E−03 | −4.8915E−02 |
| A10 = | 2.3233E−02 | −2.9004E−02 | −2.3150E−02 | −5.9985E−03 | 2.5898E−02 |
| A12 = | −4.0382E−03 | 3.8656E−03 | −6.0942E−04 | 9.9107E−04 | −3.4889E−03 |

| Surface # | 7 | 8 | 9 | 10 | 11 |
|---|---|---|---|---|---|
| k = | 1.2641E−01 | 5.5419E+01 | 2.2870E+00 | 6.0392E−01 | −1.0242E+00 |
| A4 = | −1.9748E−01 | −1.5907E−01 | −2.5336E−01 | −1.8813E−01 | 9.2434E−02 |
| A6 = | 1.6885E−01 | 3.1393E−02 | 2.1069E−01 | 4.7539E−01 | −3.1967E−02 |
| A8 = | −1.8543E−01 | 4.9024E−03 | −1.4249E−01 | −5.2214E−01 | −5.7180E−03 |
| A10 = | 1.1047E−01 | 1.0769E−03 | 5.1277E−02 | 3.1408E−01 | 2.5503E−03 |
| A12 = | −3.4933E−02 | −1.8482E−02 | −1.1942E−02 | −1.0462E−01 | 7.2462E−03 |
| A14 = | 4.2679E−03 | 6.7911E−03 | 1.9445E−03 | 1.7978E−02 | −3.9775E−03 |
| A16 = | — | — | — | −1.2341E−03 | 5.9268E−04 |

| Surface # | 12 | 13 | 14 | 15 |
|---|---|---|---|---|
| k = | −4.9926E+01 | 1.2860E+00 | −6.2566E−01 | −4.8175E+00 |
| A4 = | 1.9557E−01 | 3.4753E−02 | −2.0527E−01 | −1.2623E−01 |
| A6 = | −2.5622E−01 | −7.9605E−02 | 2.8546E−02 | 4.3883E−02 |
| A8 = | 1.6825E−01 | 3.3160E−02 | 2.1677E−02 | −8.5332E−03 |
| A10 = | −7.7761E−02 | −6.9439E−03 | −9.8290E−03 | 1.1235E−03 |
| A12 = | 2.4105E−02 | 3.6855E−04 | 1.7746E−03 | −1.1137E−04 |
| A14 = | −4.6799E−03 | 1.0422E−04 | −1.5507E−04 | 7.4025E−06 |
| A16 = | 4.1772E−04 | −1.3103E−05 | 5.4001E−06 | −2.2458E−07 |

In Table 1, the curvature radius, the thickness and the focal length are shown in millimeters (mm). Surface numbers 0-18 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
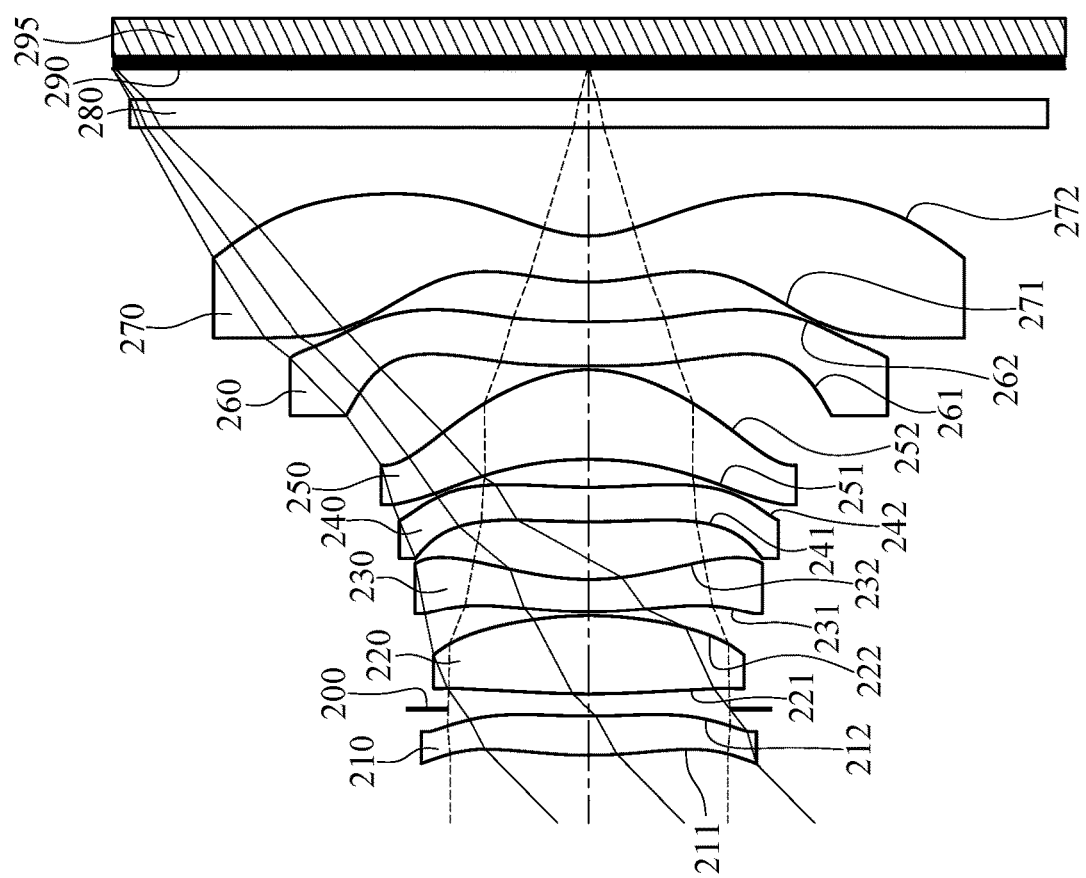
FIG. 3 is a schematic view of an image capturing unit according to the 2nd embodiment of the present disclosure.
Figure 4:
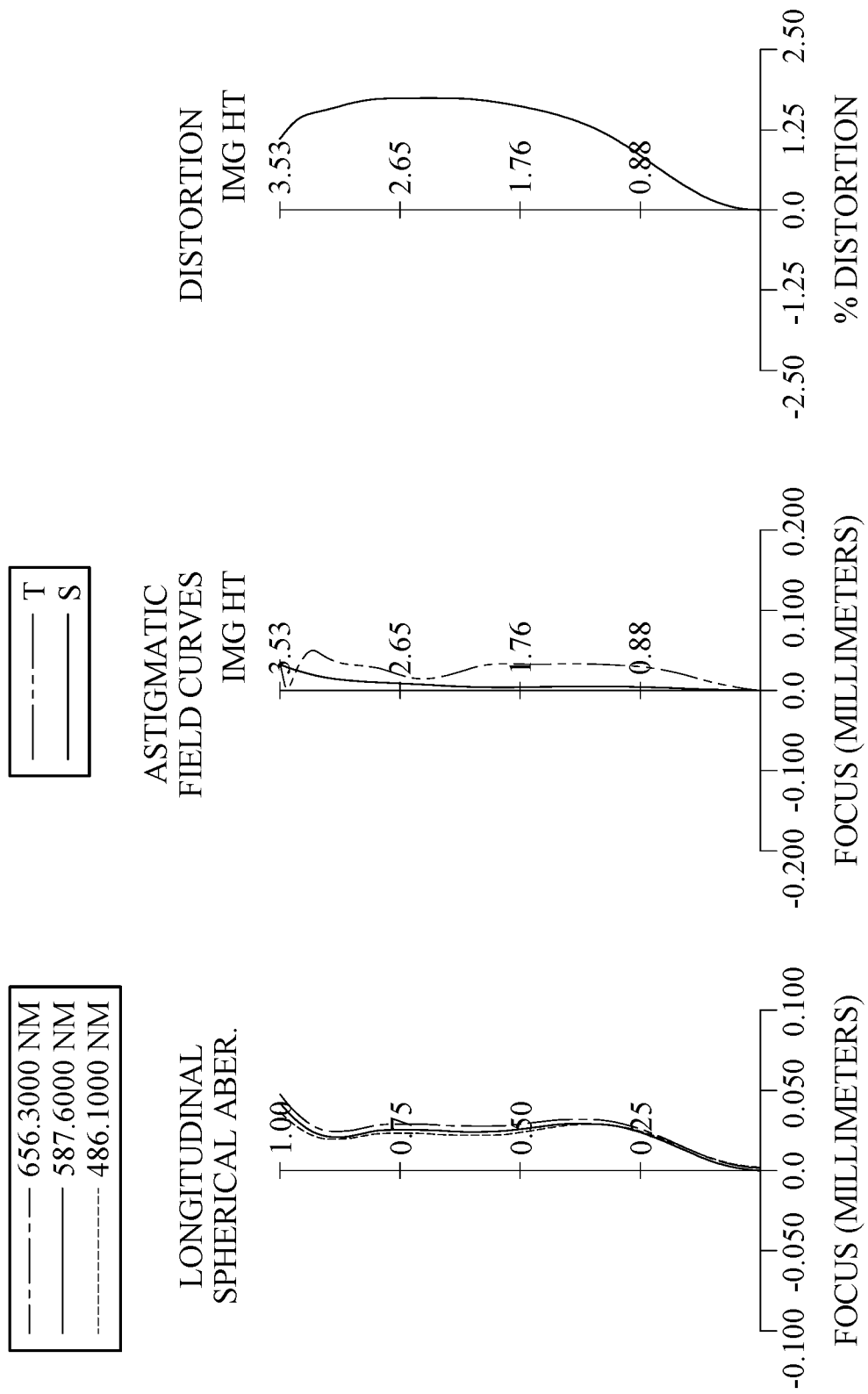
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the imaging optical lens system (its reference numeral is omitted) of the present disclosure and an image sensor 295. The imaging optical lens system includes, in order from an object side to an image side, a first lens element 210, an aperture stop 200, a second lens element 220, a third lens element 230, a fourth lens element 240, a fifth lens element 250, a sixth lens element 260, a seventh lens element 270, a filter 280 and an image surface 290. The imaging optical lens system includes seven lens elements (210, 220, 230, 240, 250, 260 and 270) with no additional lens element disposed between each of the adjacent seven lens elements.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric. Each of the object-side surface 211 and the image-side surface 212 of the first lens element 210 has at least one critical point in an off-axis region thereof.

The second lens element 220 with positive refractive power has an object-side surface 221 being convex in a paraxial region thereof and an image-side surface 222 being convex in a paraxial region thereof. The second lens element 220 is made of plastic material and has the object-side surface 221 and the image-side surface 222 being both aspheric. The object-side surface 221 of the second lens element 220 has at least one critical point in an off-axis region thereof.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. Each of the object-side surface 231 and the image-side surface 232 of the third lens element 230 has at least one critical point in an off-axis region thereof.

The fourth lens element 240 with negative refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. Each of the object-side surface 241 and the image-side surface 242 of the fourth lens element 240 has at least one critical point in an off-axis region thereof.

The fifth lens element 250 with positive refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric. The image-side surface 252 of the fifth lens element 250 has at least one critical point in an off-axis region thereof.

The sixth lens element 260 with negative refractive power has an object-side surface 261 being concave in a paraxial region thereof and an image-side surface 262 being concave in a paraxial region thereof. The sixth lens element 260 is made of plastic material and has the object-side surface 261 and the image-side surface 262 being both aspheric. Each of the object-side surface 261 and the image-side surface 262 of the sixth lens element 260 has at least one critical point in an off-axis region thereof.

The seventh lens element 270 with negative refractive power has an object-side surface 271 being convex in a paraxial region thereof and an image-side surface 272 being concave in a paraxial region thereof. The seventh lens element 270 is made of plastic material and has the object-side surface 271 and the image-side surface 272 being both aspheric. Each of the object-side surface 271 and the image-side surface 272 of the seventh lens element 270 has at least one critical point in an off-axis region thereof.

The filter 280 is made of glass material and located between the seventh lens element 270 and the image surface 290, and will not affect the focal length of the imaging optical lens system. The image sensor 295 is disposed on or near the image surface 290 of the imaging optical lens system.

The detailed optical data of the 2nd embodiment are shown in Table 3 and the aspheric surface data are shown in Table 4 below.

TABLE 3

2nd Embodiment
f = 3.53 mm, Fno = 1.72, HFOV = 44.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 3.407 (ASP) | 0.292 | Plastic | 1.545 | 56.1 | 13.73 |
| 2 | | 6.069 (ASP) | 0.051 | | | | |
| 3 | Ape. Stop | Plano | 0.112 | | | | |
| 4 | Lens 2 | 6.562 (ASP) | 0.580 | Plastic | 1.544 | 56.0 | 3.60 |
| 5 | | −2.703 (ASP) | 0.030 | | | | |
| 6 | Lens 3 | 3.619 (ASP) | 0.240 | Plastic | 1.669 | 19.5 | −5.88 |
| 7 | | 1.835 (ASP) | 0.428 | | | | |
| 8 | Lens 4 | 5.489 (ASP) | 0.255 | Plastic | 1.669 | 19.5 | −40.96 |
| 9 | | 4.488 (ASP) | 0.204 | | | | |
| 10 | Lens 5 | −2.979 (ASP) | 0.664 | Plastic | 1.544 | 56.0 | 2.77 |
| 11 | | −1.080 (ASP) | 0.030 | | | | |
| 12 | Lens 6 | −174.535 (ASP) | 0.330 | Plastic | 1.566 | 37.4 | −14.83 |
| 13 | | 8.827 (ASP) | 0.294 | | | | |
| 14 | Lens 7 | 1.661 (ASP) | 0.342 | Plastic | 1.529 | 45.4 | −3.93 |
| 15 | | 0.858 (ASP) | 0.800 | | | | |
| 16 | Filter | Plano | 0.210 | Glass | 1.517 | 64.2 | — |
| 17 | | Plano | 0.227 | | | | |
| 18 | Image | Plano | — | | | | |

Note:
Reference wavelength is 587.6 nm (d-line).
An effective radius of the image-side surface 222 (Surface 5) is 1.150 mm.

TABLE 4

Aspheric Coefficients

| | Surface # | | | | |
|---|---|---|---|---|---|
| | 1 | 2 | 4 | 5 | 6 |
| k = | −1.0274E+01 | −9.7607E+01 | 2.3023E+01 | −3.2569E+01 | 2.1035E+00 |
| A4 = | −6.9485E−02 | −8.7137E−02 | −5.1520E−02 | −1.1192E−01 | −1.2276E−01 |
| A6 = | −3.9755E−02 | −1.5314E−01 | −6.2490E−02 | 9.6458E−02 | 6.7054E−02 |
| A8 = | −4.2559E−02 | 2.0671E−01 | 1.2318E−01 | −1.1571E−01 | −1.0001E−01 |
| A10 = | 5.6124E−02 | −1.0922E−01 | −5.5054E−02 | 7.0076E−02 | 4.2279E−02 |
| A12 = | −1.3474E−02 | 2.5714E−02 | −5.1019E−03 | −2.1549E−02 | −8.4857E−04 |

TABLE 4-continued

Aspheric Coefficients

| Surface # | | | | |
|---|---|---|---|---|
| 7 | 8 | 9 | 10 | 11 |
| k = −4.0919E−02 | 2.6502E+00 | 2.1709E+00 | 4.5551E−01 | −1.0471E+00 |
| A4 = −2.2209E−01 | −1.7757E−01 | −2.1829E−01 | −1.7628E−01 | 1.5190E−01 |
| A6 = 2.4661E−01 | 1.0916E−01 | 2.1658E−01 | 4.3688E−01 | −2.1907E−01 |
| A8 = −3.0551E−01 | −1.6724E−01 | −2.7477E−01 | −5.4406E−01 | 2.2530E−01 |
| A10 = 2.0793E−01 | 1.7191E−01 | 1.9698E−01 | 3.6170E−01 | −1.6584E−01 |
| A12 = −7.5791E−02 | −1.0157E−01 | −7.6777E−02 | −1.1142E−01 | 8.5051E−02 |
| A14 = 1.0354E−02 | 2.2457E−02 | 1.2916E−02 | 9.2902E−03 | −2.4297E−02 |
| A16 = — | — | — | 1.2701E−03 | 2.8679E−03 |

| Surface # | | | |
|---|---|---|---|
| 12 | 13 | 14 | 15 |
| k = 9.9000E+01 | 7.9586E+00 | −6.5332E+00 | −3.3473E+00 |
| A4 = 3.1978E−01 | 2.0373E−01 | −2.0117E−01 | −1.8113E−01 |
| A6 = −4.6185E−01 | −3.3096E−01 | 1.0190E−02 | 8.8513E−02 |
| A8 = 3.4419E−01 | 2.2447E−01 | 2.7771E−02 | −2.7107E−02 |
| A10 = −1.6022E−01 | −8.7407E−02 | −9.9710E−03 | 5.3477E−03 |
| A12 = 4.5425E−02 | 1.9476E−02 | 1.5739E−03 | −6.6236E−04 |
| A14 = −7.5115E−03 | −2.2768E−03 | −1.2438E−04 | 4.6255E−05 |
| A16 = 5.6553E−04 | 1.0770E−04 | 4.0272E−06 | −1.3722E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.53 | f/R8 | 0.79 |
| Fno | 1.72 | f/R14 | 4.12 |
| HFOV [deg.] | 44.5 | (R3 + R4)/(R3 − R4) | 0.42 |
| V1/V4 | 2.88 | |R9/R10| | 2.76 |
| V3 + V4 | 38.9 | f/f7 | −0.90 |
| CT1/T12 | 1.79 | |f2/f1| | 0.26 |
| CT7/CT2 | 0.59 | f3/f4 | 0.14 |
| TD/(T34 + T67) | 5.34 | f5/f2 | 0.77 |
| TL [mm] | 5.09 | |f5/f3| | 0.47 |
| TL/EPD | 2.48 | f7/f6 | 0.27 |
| TL/ImgH | 1.44 | Yc62/Yc72 | 0.79 |
| f/R1 | 1.04 | — | — |

3rd Embodiment

Figure 5:
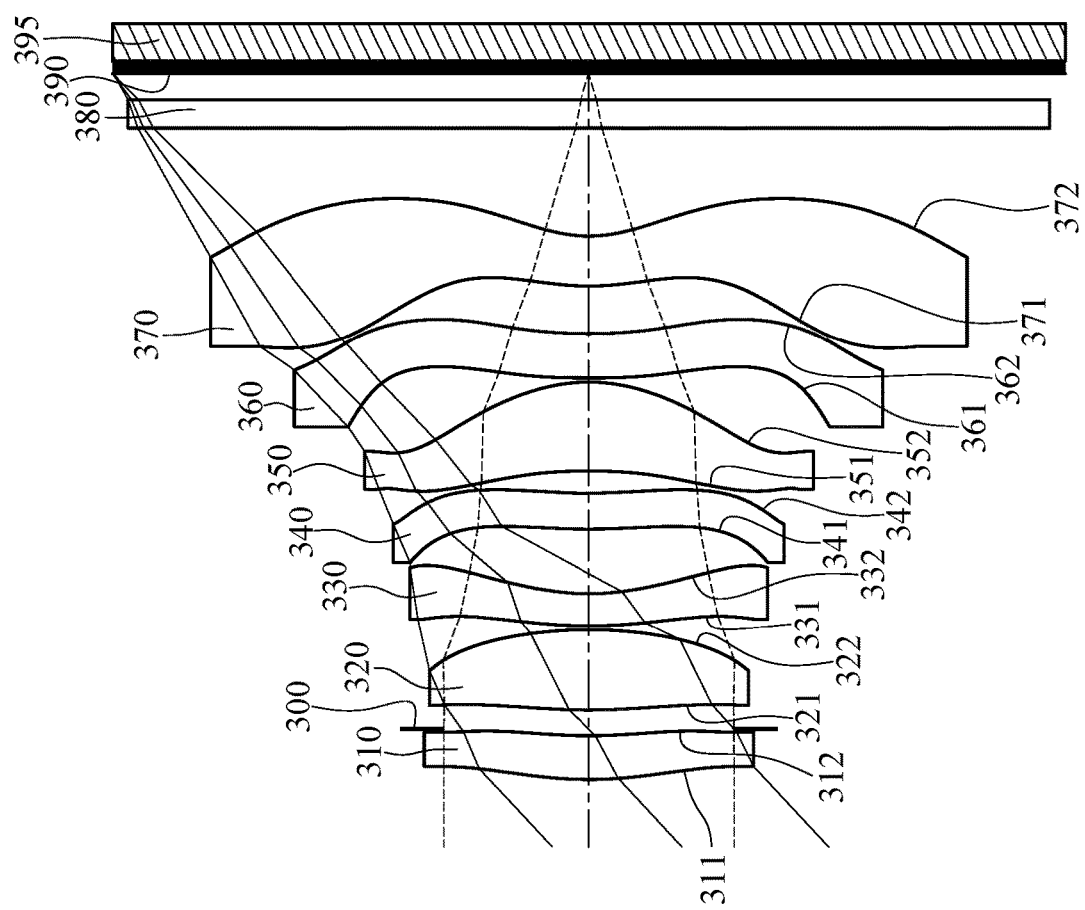
FIG. 5 is a schematic view of an image capturing unit according to the 3rd embodiment of the present disclosure.
Figure 6:
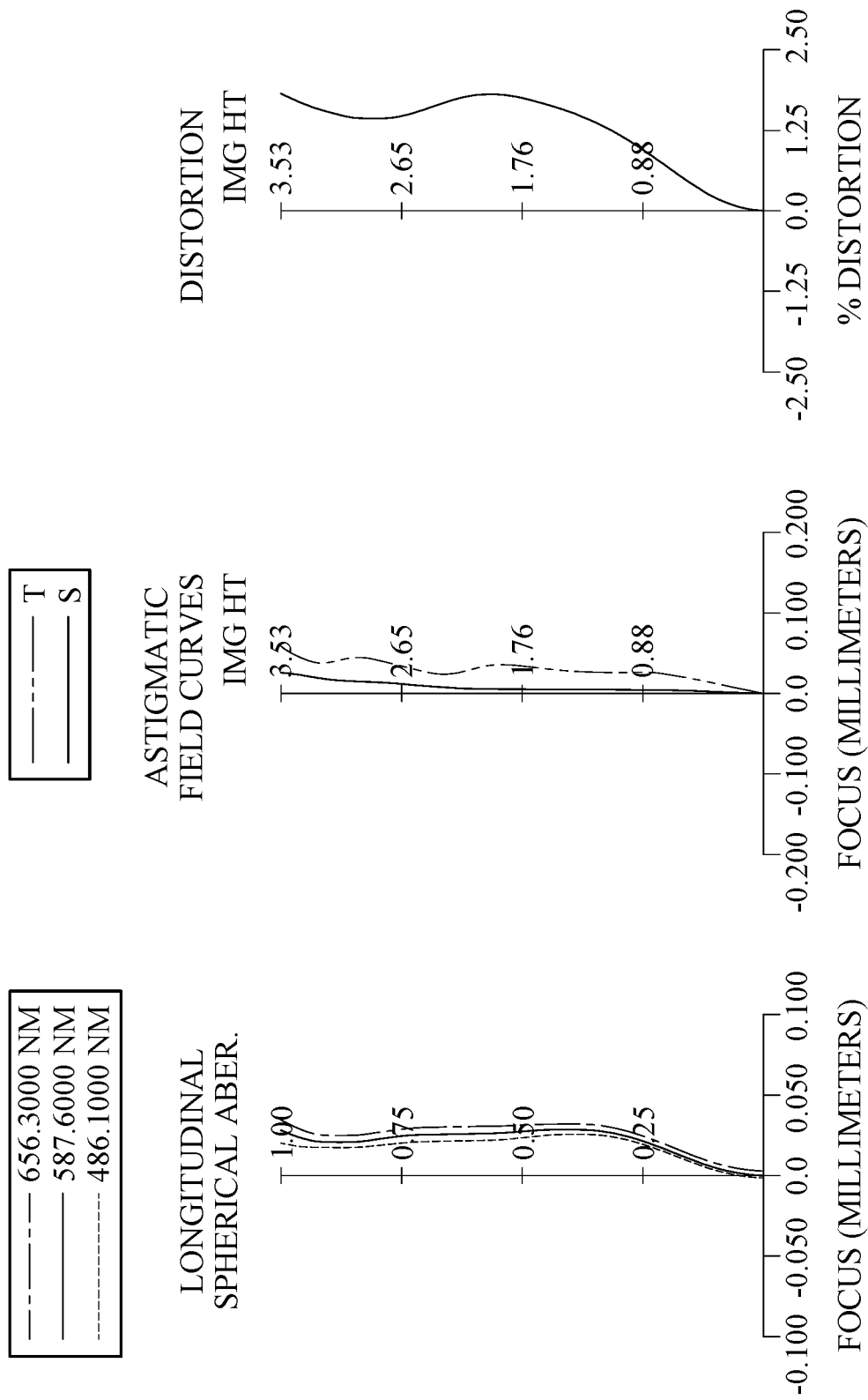
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the imaging optical lens system (its reference numeral is omitted) of the present disclosure and an image sensor 395. The imaging optical lens system includes, in order from an object side to an image side, a first lens element 310, an aperture stop 300, a second lens element 320, a third lens element 330, a fourth lens element 340, a fifth lens element 350, a sixth lens element 360, a seventh lens element 370, a filter 380 and an image surface 390. The imaging optical lens system includes seven lens elements (310, 320, 330, 340, 350, 360 and 370) with no additional lens element disposed between each of the adjacent seven lens elements.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric. Each of the object-side surface 311 and the image-side surface 312 of the first lens element 310 has at least one critical point in an off-axis region thereof.

The second lens element 320 with positive refractive power has an object-side surface 321 being convex in a paraxial region thereof and an image-side surface 322 being convex in a paraxial region thereof. The second lens element 320 is made of plastic material and has the object-side surface 321 and the image-side surface 322 being both aspheric. The object-side surface 321 of the second lens element 320 has at least one critical point in an off-axis region thereof.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. Each of the object-side surface 331 and the image-side surface 332 of the third lens element 330 has at least one critical point in an off-axis region thereof.

The fourth lens element 340 with negative refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric. Each of the object-side surface 341 and the image-side surface 342 of the fourth lens element 340 has at least one critical point in an off-axis region thereof.

The fifth lens element 350 with positive refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric. Each of the object-side surface 351 and the image-side surface 352 of the fifth lens element 350 has at least one critical point in an off-axis region thereof.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. Each of the object-side surface 361 and the image-side surface 362 of the sixth lens element 360 has at least one critical point in an off-axis region thereof.

The seventh lens element 370 with negative refractive power has an object-side surface 371 being convex in a paraxial region thereof and an image-side surface 372 being concave in a paraxial region thereof. The seventh lens element 370 is made of plastic material and has the object-side surface 371 and the image-side surface 372 being both aspheric. Each of the object-side surface 371 and the image-side surface 372 of the seventh lens element 370 has at least one critical point in an off-axis region thereof.

The filter 380 is made of glass material and located between the seventh lens element 370 and the image surface 390, and will not affect the focal length of the imaging optical lens system. The image sensor 395 is disposed on or near the image surface 390 of the imaging optical lens system.

The detailed optical data of the 3rd embodiment are shown in Table 5 and the aspheric surface data are shown in Table 6 below.

TABLE 5

3rd Embodiment
f = 3.70 mm, Fno = 1.72, HFOV = 43.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.946 (ASP) | 0.324 | Plastic | 1.545 | 56.1 | 19.39 |
| 2 | | 3.928 (ASP) | 0.049 | | | | |
| 3 | Ape. Stop | Plano | 0.140 | | | | |
| 4 | Lens 2 | 4.721 (ASP) | 0.596 | Plastic | 1.544 | 56.0 | 3.70 |
| 5 | | −3.350 (ASP) | 0.030 | | | | |
| 6 | Lens 3 | 3.367 (ASP) | 0.240 | Plastic | 1.669 | 19.5 | −6.53 |
| 7 | | 1.846 (ASP) | 0.478 | | | | |
| 8 | Lens 4 | 4.729 (ASP) | 0.267 | Plastic | 1.669 | 19.5 | −37.71 |
| 9 | | 3.892 (ASP) | 0.165 | | | | |
| 10 | Lens 5 | −4.271 (ASP) | 0.658 | Plastic | 1.544 | 56.0 | 3.04 |
| 11 | | −1.256 (ASP) | 0.030 | | | | |
| 12 | Lens 6 | 9.571 (ASP) | 0.330 | Plastic | 1.566 | 37.4 | −13.58 |
| 13 | | 4.210 (ASP) | 0.354 | | | | |
| 14 | Lens 7 | 1.909 (ASP) | 0.369 | Plastic | 1.534 | 55.9 | −4.42 |
| 15 | | 0.984 (ASP) | 0.800 | | | | |
| 16 | Filter | Plano | 0.210 | Glass | 1.517 | 64.2 | — |
| 17 | | Plano | 0.191 | | | | |
| 18 | Image | Plano | — | | | | |

Note:
Reference wavelength is 587.6 nm (d-line).
An effective radius of the image-side surface 322 (Surface 5) is 1.180 mm.

TABLE 6

Aspheric Coefficients

| Surface # | | | | | |
|---|---|---|---|---|---|
| | 1 | 2 | 4 | 5 | 6 |
| k = | 4.9938E−01 | −5.3093E+00 | 2.3435E+00 | −3.5318E+01 | 4.3362E+00 |
| A4 = | −7.4707E−02 | −1.0863E−01 | −7.5575E−02 | −1.1679E−01 | −1.3269E−01 |
| A6 = | 1.0997E−03 | −3.4731E−02 | −3.9785E−02 | 9.3688E−02 | 1.2744E−01 |
| A8 = | −3.8021E−02 | 7.2587E−02 | 7.6134E−02 | −1.0322E−01 | −1.5509E−01 |
| A10 = | 3.6889E−02 | −3.0546E−02 | −2.5810E−02 | 5.6974E−02 | 6.7556E−02 |
| A12 = | −8.7982E−03 | 8.4068E−03 | −4.4951E−03 | −1.5616E−02 | −8.5860E−03 |

| Surface # | | | | | |
|---|---|---|---|---|---|
| | 7 | 8 | 9 | 10 | 11 |
| k = | 4.1146E−01 | 6.6589E+00 | 2.2631E+00 | −2.0103E+00 | −1.0831E+00 |
| A4 = | −1.8079E−01 | −1.7288E−01 | −2.2913E−01 | −1.8121E−01 | 1.0856E−01 |
| A6 = | 1.7479E−01 | 1.0423E−01 | 2.4867E−01 | 4.5214E−01 | −1.6881E−01 |
| A8 = | −1.8949E−01 | −1.5627E−01 | −2.9974E−01 | −5.7128E−01 | 1.8934E−01 |

TABLE 6-continued

| Aspheric Coefficients | | | | | |
|---|---|---|---|---|---|
| A10 = | 9.4704E−02 | 1.3901E−01 | 2.0853E−01 | 4.4767E−01 | −1.3432E−01 |
| A12 = | −2.1750E−02 | −6.8433E−02 | −7.9469E−02 | −2.0472E−01 | 6.7134E−02 |
| A14 = | 7.2002E−04 | 1.2914E−02 | 1.2730E−02 | 5.0606E−02 | −1.8533E−02 |
| A16 = | — | — | — | −5.3152E−03 | 1.9994E−03 |

| | Surface # | | | |
|---|---|---|---|---|
| | 12 | 13 | 14 | 15 |
| k = | −9.9000E+01 | 1.2834E+00 | −5.7009E+00 | −3.3791E+00 |
| A4 = | 2.4601E−01 | 1.2571E−01 | −2.2999E−01 | −1.8198E−01 |
| A6 = | −4.1763E−01 | −2.8574E−01 | 4.1868E−02 | 9.0926E−02 |
| A8 = | 3.2356E−01 | 2.0235E−01 | 1.0594E−02 | −2.7974E−02 |
| A10 = | −1.4948E−01 | −7.6983E−02 | −4.9313E−03 | 5.3177E−03 |
| A12 = | 4.1485E−02 | 1.6202E−02 | 7.4408E−04 | −6.0849E−04 |
| A14 = | −6.7818E−03 | −1.7606E−03 | −5.1503E−05 | 3.8262E−05 |
| A16 = | 5.1556E−04 | 7.6848E−05 | 1.3751E−06 | −1.0098E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.70 | f/R8 | 0.95 |
| Fno | 1.72 | f/R14 | 3.76 |
| HFOV [deg.] | 43.0 | (R3 + R4)/(R3 − R4) | 0.17 |
| V1/V4 | 2.88 | |R9/R10| | 3.40 |
| V3 + V4 | 38.9 | f/f7 | −0.84 |
| CT1/T12 | 1.71 | |f2/f1| | 0.19 |
| CT7/CT2 | 0.62 | f3/f4 | 0.17 |
| TD/(T34 + T67) | 4.84 | f5/f2 | 0.82 |
| TL [mm] | 5.23 | |f5/f3| | 0.47 |
| TL/EPD | 2.43 | f7/f6 | 0.33 |
| TL/ImgH | 1.48 | Yc62/Yc72 | 0.78 |
| f/R1 | 1.25 | — | — |

4th Embodiment

Figure 7:
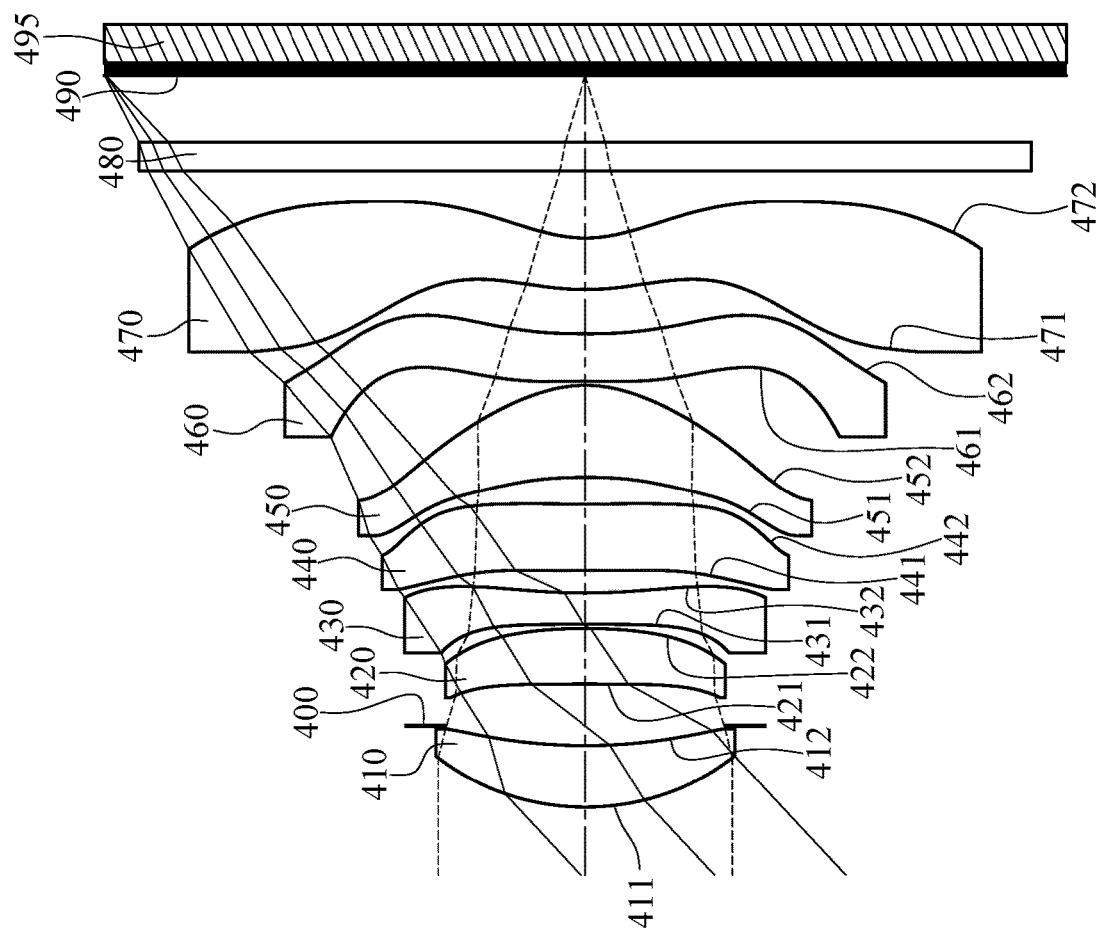
FIG. 7 is a schematic view of an image capturing unit according to the 4th embodiment of the present disclosure.
Figure 8:
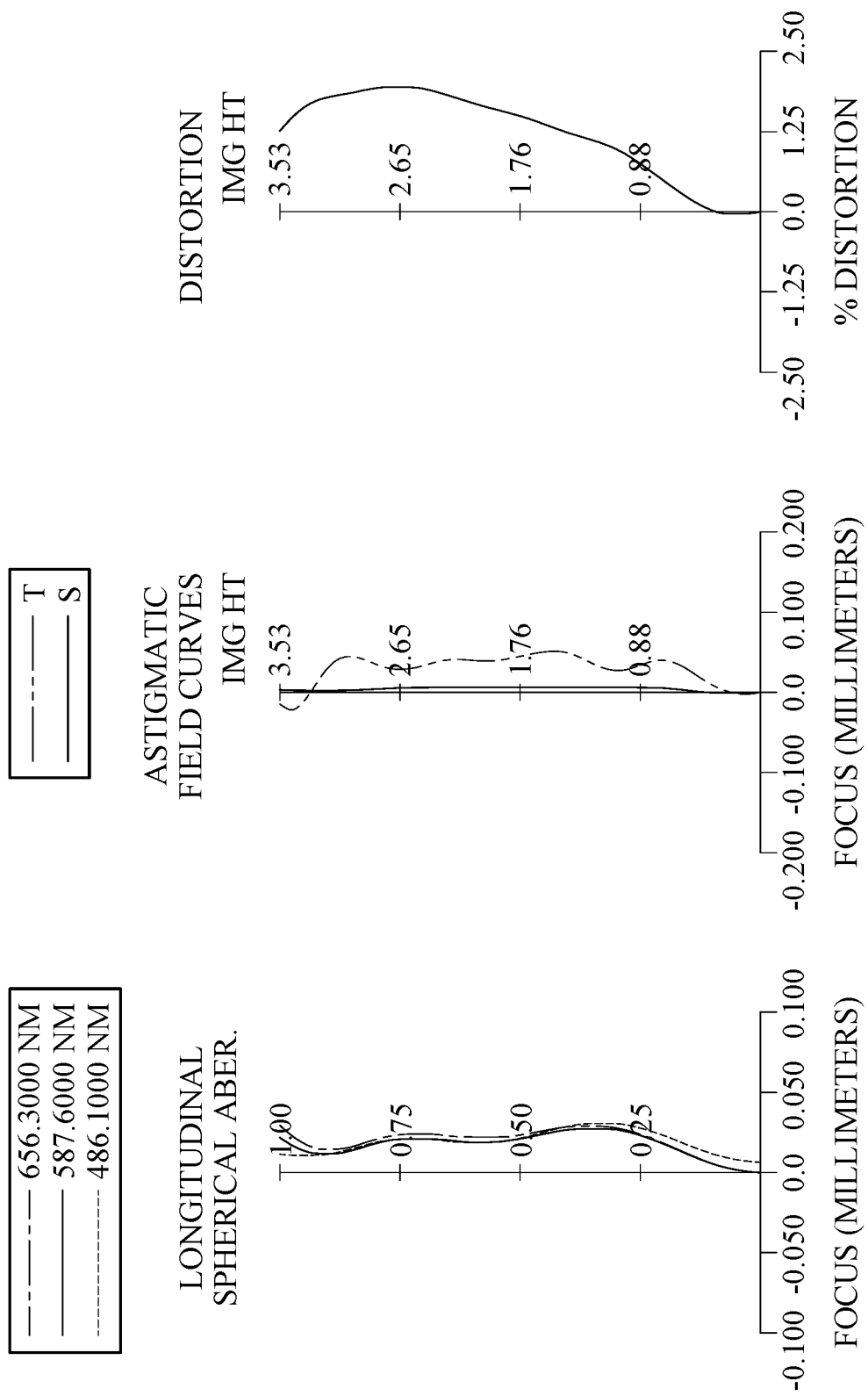
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the imaging optical lens system (its reference numeral is omitted) of the present disclosure and an image sensor 495. The imaging optical lens system includes, in order from an object side to an image side, a first lens element 410, an aperture stop 400, a second lens element 420, a third lens element 430, a fourth lens element 440, a fifth lens element 450, a sixth lens element 460, a seventh lens element 470, a filter 480 and an image surface 490. The imaging optical lens system includes seven lens elements (410, 420, 430, 440, 450, 460 and 470) with no additional lens element disposed between each of the adjacent seven lens elements.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being concave in a paraxial region thereof and an image-side surface 422 being convex in a paraxial region thereof. The second lens element 420 is made of plastic material and has the object-side surface 421 and the image-side surface 422 being both aspheric.

The third lens element 430 with negative refractive power has an object-side surface 431 being concave in a paraxial region thereof and an image-side surface 432 being concave in a paraxial region thereof. The third lens element 430 is made of plastic material and has the object-side surface 431 and the image-side surface 432 being both aspheric. The image-side surface 432 of the third lens element 430 has at least one critical point in an off-axis region thereof.

The fourth lens element 440 with negative refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. Each of the object-side surface 441 and the image-side surface 442 of the fourth lens element 440 has at least one critical point in an off-axis region thereof.

The fifth lens element 450 with positive refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric. The object-side surface 451 of the fifth lens element 450 has at least one critical point in an off-axis region thereof.

The sixth lens element 460 with negative refractive power has an object-side surface 461 being concave in a paraxial region thereof and an image-side surface 462 being concave in a paraxial region thereof. The sixth lens element 460 is made of plastic material and has the object-side surface 461 and the image-side surface 462 being both aspheric. Each of the object-side surface 461 and the image-side surface 462 of the sixth lens element 460 has at least one critical point in an off-axis region thereof.

The seventh lens element 470 with negative refractive power has an object-side surface 471 being convex in a paraxial region thereof and an image-side surface 472 being concave in a paraxial region thereof. The seventh lens element 470 is made of plastic material and has the object-side surface 471 and the image-side surface 472 being both aspheric. Each of the object-side surface 471 and the image-side surface 472 of the seventh lens element 470 has at least one critical point in an off-axis region thereof.

The filter 480 is made of glass material and located between the seventh lens element 470 and the image surface 490, and will not affect the focal length of the imaging optical lens system. The image sensor 495 is disposed on or near the image surface 490 of the imaging optical lens system.

The detailed optical data of the 4th embodiment are shown in Table 7 and the aspheric surface data are shown in Table 8 below.

TABLE 7

4th Embodiment
f = 3.72 mm, Fno = 1.72, HFOV = 43.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.860 (ASP) | 0.455 | Plastic | 1.545 | 56.1 | 5.86 |
| 2 | | 4.067 (ASP) | 0.144 | | | | |
| 3 | Ape. Stop | Plano | 0.309 | | | | |
| 4 | Lens 2 | −78.951 (ASP) | 0.409 | Plastic | 1.544 | 56.0 | 7.18 |
| 5 | | −3.728 (ASP) | 0.030 | | | | |
| 6 | Lens 3 | −100.000 (ASP) | 0.230 | Plastic | 1.669 | 19.5 | −6.13 |
| 7 | | 4.279 (ASP) | 0.165 | | | | |
| 8 | Lens 4 | 13.816 (ASP) | 0.491 | Plastic | 1.614 | 26.0 | −122.68 |
| 9 | | 11.516 (ASP) | 0.200 | | | | |
| 10 | Lens 5 | −4.101 (ASP) | 0.678 | Plastic | 1.566 | 37.4 | 2.08 |
| 11 | | −0.969 (ASP) | 0.030 | | | | |
| 12 | Lens 6 | −11.832 (ASP) | 0.350 | Plastic | 1.669 | 19.5 | −5.50 |
| 13 | | 5.400 (ASP) | 0.325 | | | | |
| 14 | Lens 7 | 1.925 (ASP) | 0.378 | Plastic | 1.614 | 26.0 | −3.97 |
| 15 | | 0.995 (ASP) | 0.500 | | | | |
| 16 | Filter | Plano | 0.210 | Glass | 1.517 | 64.2 | — |
| 17 | | Plano | 0.489 | | | | |
| 18 | Image | Plano | — | | | | |

Note:
Reference wavelength is 587.6 nm (d-line).
An effective radius of the object-side surface 411 (Surface 1) is 1.100 mm.
An effective radius of the image-side surface 422 (Surface 5) is 1.030 mm.

TABLE 8

Aspheric Coefficients

| Surface # | 1 | 2 | 4 | 5 | 6 |
|---|---|---|---|---|---|
| k = | −1.2289E−01 | −1.7357E−01 | 9.9000E+01 | −3.4109E+01 | 9.9000E+01 |
| A4 = | 1.9452E−03 | 6.2243E−03 | −5.7980E−02 | −1.3235E−01 | −8.9857E−02 |
| A6 = | 4.5121E−02 | −7.9051E−03 | −1.3992E−02 | 4.1737E−02 | 7.0665E−02 |
| A8 = | −7.9660E−02 | 1.0876E−02 | −2.8824E−02 | −1.5017E−01 | −3.2274E−01 |
| A10 = | 7.8005E−02 | −1.4904E−02 | 3.7719E−03 | 1.5458E−01 | 3.2685E−01 |
| A12 = | −2.9564E−02 | — | — | −5.6156E−02 | −1.3014E−01 |

| Surface # | 7 | 8 | 9 | 10 | 11 |
|---|---|---|---|---|---|
| k = | −3.4271E+00 | 6.5460E+01 | 5.6212E−01 | 3.0290E+00 | −1.6154E+00 |
| A4 = | −9.0880E−02 | −1.3360E−01 | −2.0397E−01 | −3.5373E−01 | 1.3970E−01 |
| A6 = | 1.2419E−01 | 1.2139E−01 | 3.7126E−01 | 8.7110E−01 | −2.1006E−01 |
| A8 = | −2.3732E−01 | −2.2842E−01 | −4.4066E−01 | −9.1286E−01 | 2.1537E−01 |
| A10 = | 2.1223E−01 | 2.3991E−01 | 2.4625E−01 | 4.7568E−01 | −1.6348E−01 |
| A12 = | −9.1107E−02 | −1.1136E−01 | −7.2057E−02 | −1.3271E−01 | 7.5968E−02 |
| A14 = | 1.4866E−02 | 1.9007E−02 | 9.4795E−03 | 2.0072E−02 | −1.7995E−02 |
| A16 = | — | — | — | −1.3798E−03 | 1.6704E−03 |

| Surface # | 12 | 13 | 14 | 15 |
|---|---|---|---|---|
| k = | 3.2334E+01 | −9.9000E+01 | −2.1794E+00 | −3.7719E+00 |
| A4 = | 3.9140E−01 | 2.5115E−01 | −2.2668E−01 | −1.5299E−01 |
| A6 = | −4.3109E−01 | −3.1383E−01 | 2.9149E−02 | 5.9206E−02 |

TABLE 8-continued

| Aspheric Coefficients | | | | |
|---|---|---|---|---|
| A8 = | 2.3682E−01 | 1.7443E−01 | 1.5336E−02 | −1.1599E−02 |
| A10 = | −7.8214E−02 | −6.0013E−02 | −5.9986E−03 | 1.1259E−03 |
| A12 = | 1.4065E−02 | 1.2618E−02 | 9.0849E−04 | −3.8670E−05 |
| A14 = | −1.0967E−03 | −1.4463E−03 | −6.6823E−05 | −1.2940E−06 |
| A16 = | 1.0334E−05 | 6.8492E−05 | 1.9900E−06 | 9.2048E−08 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.72 | f/R8 | 0.32 |
| Fno | 1.72 | f/R14 | 3.74 |
| HFOV [deg.] | 43.0 | (R3 + R4)/(R3 − R4) | 1.10 |
| V1/V4 | 2.16 | \|R9/R10\| | 4.23 |
| V3 + V4 | 45.4 | f/f7 | −0.94 |
| CT1/T12 | 1.00 | \|f2/f1\| | 1.22 |
| CT7/CT2 | 0.92 | f3/f4 | 0.05 |
| TD/(T34 + T67) | 8.56 | f5/f2 | 0.29 |
| TL [mm] | 5.39 | \|f5/f3\| | 0.34 |
| TL/EPD | 2.49 | f7/f6 | 0.72 |
| TL/ImgH | 1.53 | Yc62/Yc72 | 0.79 |
| f/R1 | 2.00 | — | — |

5th Embodiment

Figure 9:
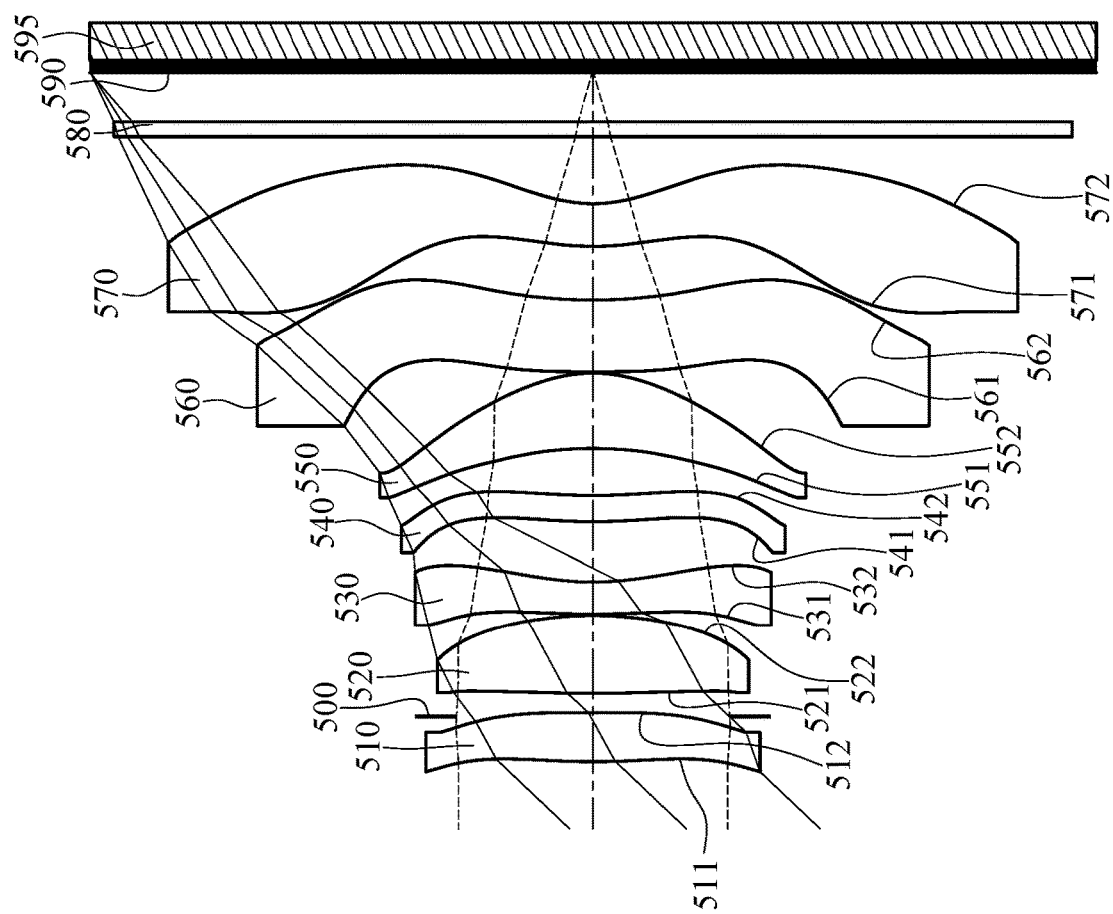
FIG. 9 is a schematic view of an image capturing unit according to the 5th embodiment of the present disclosure.
Figure 10:
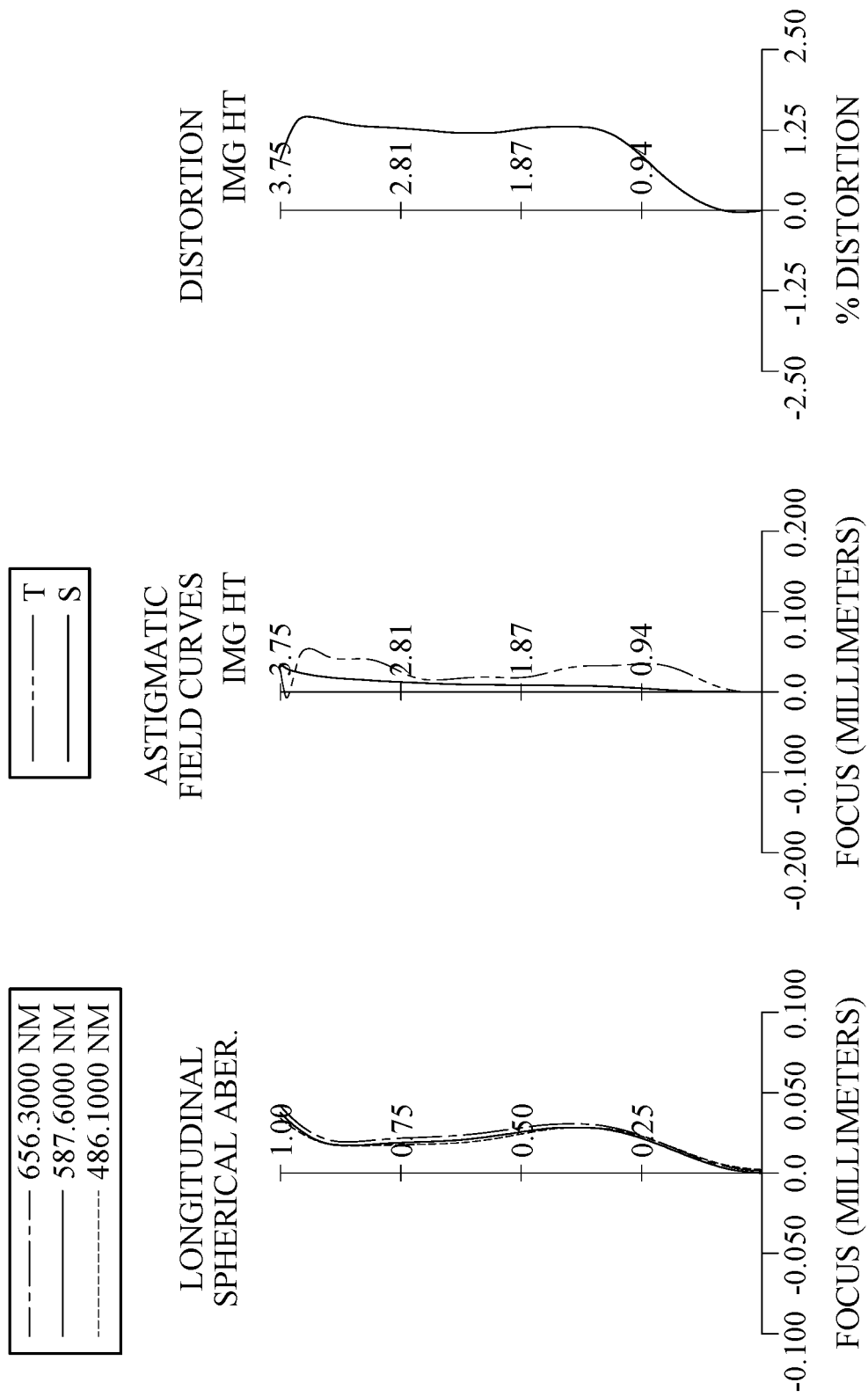
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the imaging optical lens system (its reference numeral is omitted) of the present disclosure and an image sensor 595. The imaging optical lens system includes, in order from an object side to an image side, a first lens element 510, an aperture stop 500, a second lens element 520, a third lens element 530, a fourth lens element 540, a fifth lens element 550, a sixth lens element 560, a seventh lens element 570, a filter 580 and an image surface 590. The imaging optical lens system includes seven lens elements (510, 520, 530, 540, 550, 560 and 570) with no additional lens element disposed between each of the adjacent seven lens elements.

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric. The object-side surface 511 of the first lens element 510 has at least one critical point in an off-axis region thereof.

The second lens element 520 with positive refractive power has an object-side surface 521 being convex in a paraxial region thereof and an image-side surface 522 being convex in a paraxial region thereof. The second lens element 520 is made of plastic material and has the object-side surface 521 and the image-side surface 522 being both aspheric. The object-side surface 521 of the second lens element 520 has at least one critical point in an off-axis region thereof.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. Each of the object-side surface 531 and the image-side surface 532 of the third lens element 530 has at least one critical point in an off-axis region thereof.

The fourth lens element 540 with positive refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. Each of the object-side surface 541 and the image-side surface 542 of the fourth lens element 540 has at least one critical point in an off-axis region thereof.

The fifth lens element 550 with positive refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric. The image-side surface 552 of the fifth lens element 550 has at least one critical point in an off-axis region thereof.

The sixth lens element 560 with negative refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. Each of the object-side surface 561 and the image-side surface 562 of the sixth lens element 560 has at least one critical point in an off-axis region thereof.

The seventh lens element 570 with negative refractive power has an object-side surface 571 being convex in a paraxial region thereof and an image-side surface 572 being concave in a paraxial region thereof. The seventh lens element 570 is made of plastic material and has the object-side surface 571 and the image-side surface 572 being both aspheric. Each of the object-side surface 571 and the image-side surface 572 of the seventh lens element 570 has at least one critical point in an off-axis region thereof.

The filter 580 is made of glass material and located between the seventh lens element 570 and the image surface 590, and will not affect the focal length of the imaging optical lens system. The image sensor 595 is disposed on or near the image surface 590 of the imaging optical lens system.

The detailed optical data of the 5th embodiment are shown in Table 9 and the aspheric surface data are shown in Table 10 below.

In the 5th embodiment, the equation of the aspheric surface profiles of the aforementioned lens elements is the same as the equation of the 1st embodiment. Also, the

TABLE 9

5th Embodiment
f = 3.51 mm, Fno = 1.75, HFOV = 46.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 5.557 (ASP) | 0.366 | Plastic | 1.545 | 56.1 | 9.90 |
| 2 | | −178.253 (ASP) | −0.030 | | | | |
| 3 | Ape. Stop | Plano | 0.174 | | | | |
| 4 | Lens 2 | 9.721 (ASP) | 0.583 | Plastic | 1.544 | 56.0 | 4.00 |
| 5 | | −2.745 (ASP) | 0.010 | | | | |
| 6 | Lens 3 | 5.249 (ASP) | 0.239 | Plastic | 1.642 | 22.5 | −5.40 |
| 7 | | 2.050 (ASP) | 0.453 | | | | |
| 8 | Lens 4 | 4.134 (ASP) | 0.193 | Plastic | 1.669 | 19.5 | 118.23 |
| 9 | | 4.280 (ASP) | 0.350 | | | | |
| 10 | Lens 5 | −3.329 (ASP) | 0.563 | Plastic | 1.544 | 56.0 | 2.79 |
| 11 | | −1.104 (ASP) | 0.010 | | | | |
| 12 | Lens 6 | 45.070 (ASP) | 0.540 | Plastic | 1.614 | 26.0 | −8.45 |
| 13 | | 4.629 (ASP) | 0.400 | | | | |
| 14 | Lens 7 | 2.104 (ASP) | 0.316 | Plastic | 1.566 | 37.4 | −3.95 |
| 15 | | 1.025 (ASP) | 0.500 | | | | |
| 16 | Filter | Plano | 0.110 | Glass | 1.517 | 64.2 | — |
| 17 | | Plano | 0.367 | | | | |
| 18 | Image | Plano | — | | | | |

Note:
Reference wavelength is 587.6 nm (d-line).
An effective radius of the image-side surface 522 (Surface 5) is 1.160 mm.

TABLE 10

Aspheric Coefficients

| | Surface # | | | | |
|---|---|---|---|---|---|
| | 1 | 2 | 4 | 5 | 6 |
| k = | −7.6265E−01 | −9.9000E+01 | 3.6486E+01 | −2.8357E+01 | 2.5158E+00 |
| A4 = | −8.8804E−02 | −1.4979E−01 | −7.4776E−01 | −1.1648E−01 | −1.5928E−01 |
| A6 = | −2.4311E−02 | 2.2292E−02 | 3.4350E−02 | 9.7155E−02 | 1.4573E−01 |
| A8 = | 1.9201E−03 | 6.3667E−02 | 4.0244E−02 | −1.3643E−01 | −2.1779E−01 |
| A10 = | 1.3661E−02 | −5.6271E−02 | −4.4731E−02 | 8.4897E−02 | 1.3955E−01 |
| A12 = | −3.2335E−03 | 1.8086E−02 | 1.6839E−03 | −2.3938E−02 | −2.8469E−02 |

| | Surface # | | | | |
|---|---|---|---|---|---|
| | 7 | 8 | 9 | 10 | 11 |
| k = | 1.5100E−01 | 5.9527E+00 | 2.9628E+00 | 7.9696E−01 | −1.0596E+00 |
| A4 = | −2.3225E−01 | −1.6372E−01 | −1.7729E−01 | −1.8950E−01 | 1.3513E−01 |
| A6 = | 2.4395E−01 | 1.4018E−01 | 2.1858E−01 | 4.6316E−01 | −1.2578E−01 |
| A8 = | −2.7673E−01 | −2.7745E−01 | −3.3077E−01 | −3.9107E−01 | 1.7740E−01 |
| A10 = | 1.7784E−01 | 2.7662E−01 | 2.4603E−01 | 6.8382E−02 | −1.9443E−01 |
| A12 = | −6.0254E−02 | −1.4061E−01 | −9.3716E−02 | 7.8508E−02 | 1.1409E−01 |
| A14 = | 7.7867E−03 | 2.7064E−02 | 1.4792E−02 | −4.3875E−02 | −3.2782E−02 |
| A16 = | — | — | — | 6.7003E−03 | 3.7266E−03 |

| | Surface # | | | |
|---|---|---|---|---|
| | 12 | 13 | 14 | 15 |
| k = | −7.6364E+01 | 1.6024E+00 | −7.7339E+00 | −3.7084E+00 |
| A4 = | 2.1604E−01 | 8.4277E−02 | −1.3713E−01 | −1.1675E−01 |
| A6 = | −2.4229E−01 | −1.1521E−01 | −6.8948E−04 | 3.2256E−02 |
| A8 = | 1.3052E−01 | 4.9977E−02 | 1.5794E−02 | −4.6578E−03 |
| A10 = | −5.0719E−02 | −1.2724E−02 | −4.3547E−03 | 4.0242E−04 |
| A12 = | 1.4562E−02 | 1.9529E−03 | 5.3907E−04 | −2.9634E−05 |
| A14 = | −2.7685E−03 | −1.6260E−04 | −3.2824E−05 | 2.1069E−06 |
| A16 = | 2.3830E−04 | 5.5167E−06 | 7.9538E−07 | −7.5486E−08 | definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.51 | f/R8 | 0.82 |
| Fno | 1.75 | f/R14 | 3.43 |
| HFOV [deg.] | 46.5 | (R3 + R4)/(R3 − R4) | 0.56 |
| V1/V4 | 2.88 | \|R9/R10\| | 3.01 |
| V3 + V4 | 41.9 | f/f7 | −0.89 |
| CT1/T12 | 2.54 | \|f2/f1\| | 0.40 |
| CT7/CT2 | 0.54 | f3/f4 | −0.05 |
| TD/(T34 + T67) | 4.89 | f5/f2 | 0.70 |
| TL [mm] | 5.14 | \|f5/f3\| | 0.52 |
| TL/EPD | 2.56 | f7/f6 | 0.47 |
| TL/ImgH | 1.37 | Yc62/Yc72 | 0.94 |
| f/R1 | 0.63 | — | — |

6th Embodiment

Figure 11:
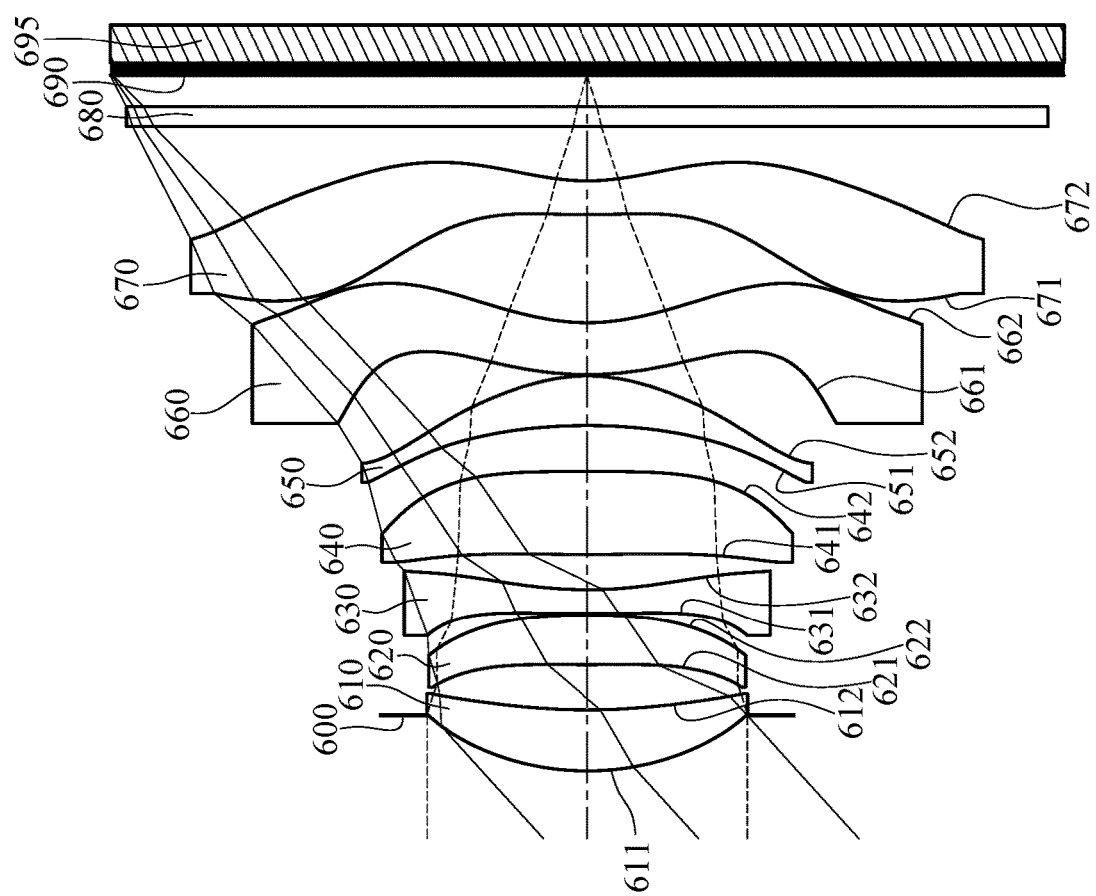
FIG. 11 is a schematic view of an image capturing unit according to the 6th embodiment of the present disclosure.
Figure 12:
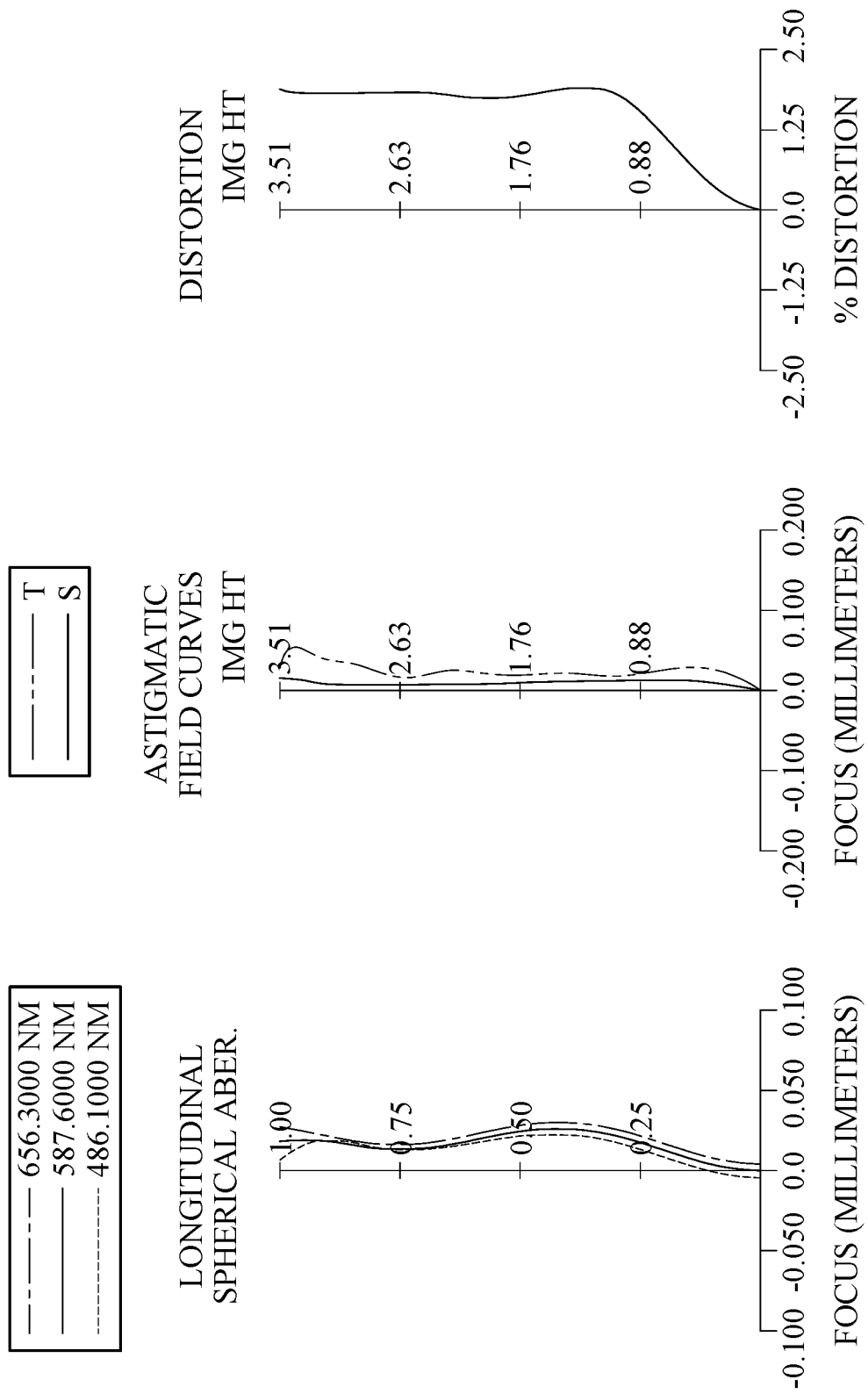
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the imaging optical lens system (its reference numeral is omitted) of the present disclosure and an image sensor 695. The imaging optical lens system includes, in order from an object side to an image side, an aperture stop 600, a first lens element 610, a second lens element 620, a third lens element 630, a fourth lens element 640, a fifth lens element 650, a sixth lens element 660, a seventh lens element 670, a filter 680 and an image surface 690. The imaging optical lens system includes seven lens elements (610, 620, 630, 640, 650, 660 and 670) with no additional lens element disposed between each of the adjacent seven lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with positive refractive power has an object-side surface 621 being convex in a paraxial region thereof and an image-side surface 622 being convex in a paraxial region thereof. The second lens element 620 is made of plastic material and has the object-side surface 621 and the image-side surface 622 being both aspheric. The object-side surface 621 of the second lens element 620 has at least one critical point in an off-axis region thereof.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. The object-side surface 631 of the third lens element 630 has at least one critical point in an off-axis region thereof.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric. The object-side surface 641 of the fourth lens element 640 has at least one critical point in an off-axis region thereof.

The fifth lens element 650 with positive refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric. The image-side surface 652 of the fifth lens element 650 has at least one critical point in an off-axis region thereof.

The sixth lens element 660 with negative refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. Each of the object-side surface 661 and the image-side surface 662 of the sixth lens element 660 has at least one critical point in an off-axis region thereof.

The seventh lens element 670 with negative refractive power has an object-side surface 671 being convex in a paraxial region thereof and an image-side surface 672 being concave in a paraxial region thereof. The seventh lens element 670 is made of plastic material and has the object-side surface 671 and the image-side surface 672 being both aspheric. Each of the object-side surface 671 and the image-side surface 672 of the seventh lens element 670 has at least one critical point in an off-axis region thereof.

The filter 680 is made of glass material and located between the seventh lens element 670 and the image surface 690, and will not affect the focal length of the imaging optical lens system. The image sensor 695 is disposed on or near the image surface 690 of the imaging optical lens system.

The detailed optical data of the 6th embodiment are shown in Table 11 and the aspheric surface data are shown in Table 12 below.

TABLE 11

| 6th Embodiment f = 3.78 mm, Fno = 1.60, HFOV = 42.2 deg. | | | | | | |
|---|---|---|---|---|---|---|
| Surface # | | Curvature Radius | Thickness | Material | Index | Abbe # | Focal Length |
| 0 | Object | Plano | Infinity | | | | |
| 1 | Ape. Stop | Plano | −0.408 | | | | |
| 2 | Lens 1 | 1.988 (ASP) | 0.449 | Plastic | 1.545 | 56.1 | 6.04 |
| 3 | | 4.626 (ASP) | 0.335 | | | | |
| 4 | Lens 2 | 22.755 (ASP) | 0.371 | Plastic | 1.544 | 56.0 | 8.18 |

TABLE 11-continued

6th Embodiment
f = 3.78 mm, Fno = 1.60, HFOV = 42.2 deg.

| Surface # | | Curvature Radius | Thickness | Material | Index | Abbe # | Focal Length |
|---|---|---|---|---|---|---|---|
| 5 | | −5.503 (ASP) | 0.010 | | | | |
| 6 | Lens 3 | 15.707 (ASP) | 0.176 | Plastic | 1.669 | 19.5 | −5.73 |
| 7 | | 3.069 (ASP) | 0.259 | | | | |
| 8 | Lens 4 | 12.122 (ASP) | 0.615 | Plastic | 1.582 | 30.2 | 19.64 |
| 9 | | −200.000 (ASP) | 0.338 | | | | |
| 10 | Lens 5 | −4.669 (ASP) | 0.367 | Plastic | 1.544 | 56.0 | 3.34 |
| 11 | | −1.345 (ASP) | 0.010 | | | | |
| 12 | Lens 6 | 2.514 (ASP) | 0.388 | Plastic | 1.529 | 45.4 | −9.40 |
| 13 | | 1.581 (ASP) | 0.797 | | | | |
| 14 | Lens 7 | 6.442 (ASP) | 0.250 | Plastic | 1.529 | 45.4 | −4.16 |
| 15 | | 1.619 (ASP) | 0.400 | | | | |
| 16 | Filter | Plano | 0.145 | Glass | 1.517 | 64.2 | — |
| 17 | | Plano | 0.233 | | | | |
| 18 | Image | Plano | — | | | | |

Note:
Reference wavelength is 587.6 nm (d-line).
An effective radius of the image-side surface 622 (Surface 5) is 1.170 mm.

TABLE 12

Aspheric Coefficients

| | Surface # | | | | |
|---|---|---|---|---|---|
| | 2 | 3 | 4 | 5 | 6 |
| k = | −2.7907E−01 | −4.0539E+00 | −9.9000E+01 | −5.4022E+01 | 4.4111E+01 |
| A4 = | 3.5839E−03 | −1.8347E−02 | −1.2473E−01 | −1.5415E−01 | −5.8483E−02 |
| A6 = | 8.2366E−03 | 4.0647E−03 | −3.1275E−03 | 2.4223E−02 | −2.6267E−02 |
| A8 = | −6.9930E−05 | 2.4374E−03 | 2.9069E−02 | 4.5444E−02 | −7.7551E−03 |
| A10 = | −5.5345E−05 | −6.2956E−04 | −1.5475E−02 | −4.5234E−02 | 6.6250E−03 |
| A12 = | 1.6061E−03 | — | — | 1.0699E−02 | −4.3391E−03 |

| | Surface # | | | | |
|---|---|---|---|---|---|
| | 7 | 8 | 9 | 10 | 11 |
| k = | 2.1739E−01 | 2.0804E+01 | 9.9000E+01 | 1.2695E+00 | −1.6605E+00 |
| A4 = | −6.2453E−02 | −9.3475E−02 | −1.1261E−01 | −1.1820E−01 | 4.5510E−02 |
| A6 = | 4.7100E−02 | 6.4009E−02 | 6.3883E−02 | 3.0295E−01 | 5.5527E−02 |
| A8 = | −1.0699E−01 | −3.2459E−02 | −7.6367E−02 | −4.1615E−01 | −1.5330E−01 |
| A10 = | 9.9089E−02 | 8.8334E−03 | 5.4646E−02 | 3.0108E−01 | 1.2084E−01 |
| A12 = | −4.1996E−02 | −1.0408E−03 | −2.1374E−02 | −1.1932E−01 | −4.3176E−02 |
| A14 = | 7.0488E−03 | 1.5230E−04 | 3.3714E−03 | 2.4606E−02 | 7.1003E−03 |
| A16 = | — | — | — | −2.0600E−03 | −3.9871E−04 |

| | Surface # | | | |
|---|---|---|---|---|
| | 12 | 13 | 14 | 15 |
| k = | −3.8652E+01 | −1.0806E+01 | 9.3738E−01 | −6.7497E+00 |
| A4 = | 2.1726E−01 | 9.5981E−02 | −2.4660E−01 | −1.1707E−01 |
| A6 = | −3.0978E−01 | −1.2295E−01 | 8.8154E−02 | 3.7212E−02 |
| A8 = | 2.1136E−01 | 6.2058E−02 | −1.4171E−02 | −7.9554E−03 |
| A10 = | −9.8874E−02 | −1.8744E−02 | 1.1257E−03 | 1.3491E−03 |
| A12 = | 3.0801E−02 | 3.3506E−03 | −3.5520E−05 | −1.6790E−04 |
| A14 = | −5.8711E−03 | −3.1894E−04 | −2.0743E−07 | 1.2324E−05 |
| A16 = | 5.0342E−04 | 1.2351E−05 | 1.7497E−08 | −3.7833E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.78 | f/R8 | −0.02 |
| Fno | 1.60 | f/R14 | 2.34 |
| HFOV [deg.] | 42.2 | (R3 + R4)/(R3 − R4) | 0.61 |
| V1/V4 | 1.85 | |R9/R10| | 3.47 |
| V3 + V4 | 49.7 | f/f7 | −0.91 |
| CT1/T12 | 1.34 | |f2/f1| | 1.36 |
| CT7/CT2 | 0.67 | f3/f4 | −0.29 |

-continued

| | 6th Embodiment | | |
|---|---|---|---|
| TD/(T34 + T67) | 4.13 | f5/f2 | 0.41 |
| TL [mm] | 5.14 | |f5/f3| | 0.58 |
| TL/EPD | 2.18 | f7/f6 | 0.44 |
| TL/ImgH | 1.47 | Yc62/Yc72 | 1.34 |
| f/R1 | 1.90 | — | — |

7th Embodiment

Figure 13:
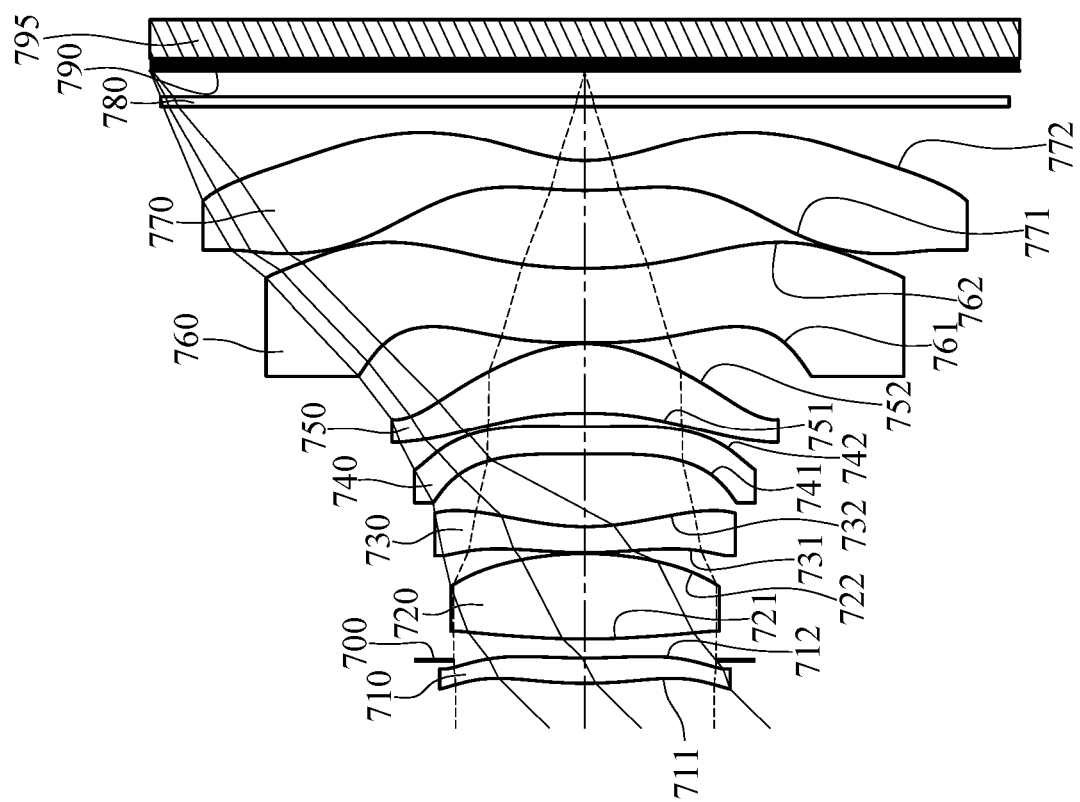
FIG. 13 is a schematic view of an image capturing unit according to the 7th embodiment of the present disclosure.
Figure 14:
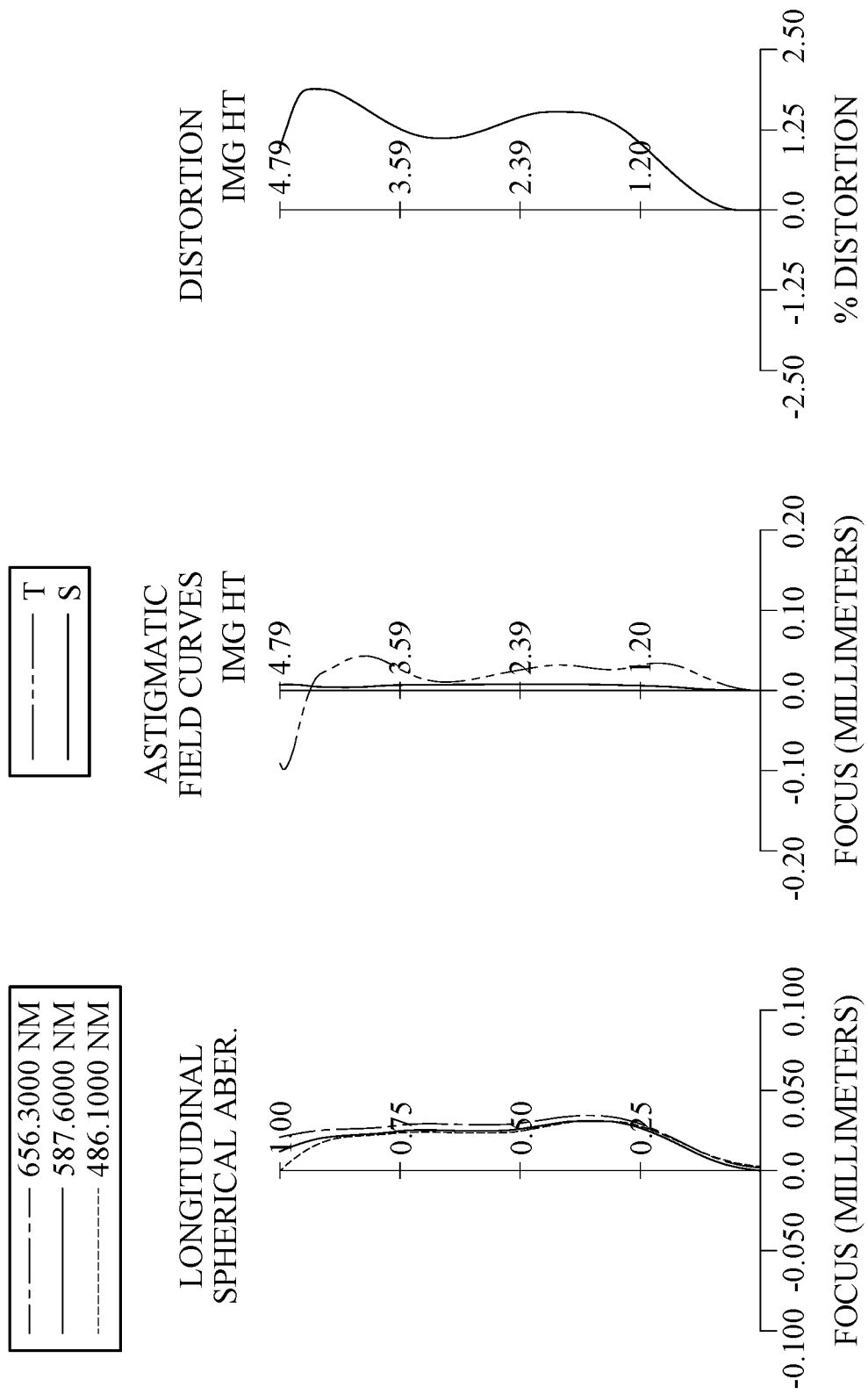
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the imaging optical lens system (its reference numeral is omitted) of the present disclosure and an image sensor 795. The imaging optical lens system includes, in order from an object side to an image side, a first lens element 710, an aperture stop 700, a second lens element 720, a third lens element 730, a fourth lens element 740, a fifth lens element 750, a sixth lens element 760, a seventh lens element 770, a filter 780 and an image surface 790. The imaging optical lens system includes seven lens elements (710, 720, 730, 740, 750, 760 and 770) with no additional lens element disposed between each of the adjacent seven lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric. Each of the object-side surface 711 and the image-side surface 712 of the first lens element 710 has at least one critical point in an off-axis region thereof.

The second lens element 720 with positive refractive power has an object-side surface 721 being convex in a paraxial region thereof and an image-side surface 722 being convex in a paraxial region thereof. The second lens element 720 is made of plastic material and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric. Each of the object-side surface 731 and the image-side surface 732 of the third lens element 730 has at least one critical point in an off-axis region thereof.

The fourth lens element 740 with negative refractive power has an object-side surface 741 being concave in a paraxial region thereof and an image-side surface 742 being concave in a paraxial region thereof. The fourth lens element 740 is made of plastic material and has the object-side surface 741 and the image-side surface 742 being both aspheric. The image-side surface 742 of the fourth lens element 740 has at least one critical point in an off-axis region thereof.

The fifth lens element 750 with positive refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric. The image-side surface 752 of the fifth lens element 750 has at least one critical point in an off-axis region thereof.

The sixth lens element 760 with negative refractive power has an object-side surface 761 being convex in a paraxial region thereof and an image-side surface 762 being concave in a paraxial region thereof. The sixth lens element 760 is made of plastic material and has the object-side surface 761 and the image-side surface 762 being both aspheric. Each of the object-side surface 761 and the image-side surface 762 of the sixth lens element 760 has at least one critical point in an off-axis region thereof.

The seventh lens element 770 with negative refractive power has an object-side surface 771 being convex in a paraxial region thereof and an image-side surface 772 being concave in a paraxial region thereof. The seventh lens element 770 is made of plastic material and has the object-side surface 771 and the image-side surface 772 being both aspheric. Each of the object-side surface 771 and the image-side surface 772 of the seventh lens element 770 has at least one critical point in an off-axis region thereof.

The filter 780 is made of glass material and located between the seventh lens element 770 and the image surface 790, and will not affect the focal length of the imaging optical lens system. The image sensor 795 is disposed on or near the image surface 790 of the imaging optical lens system.

The detailed optical data of the 7th embodiment are shown in Table 13 and the aspheric surface data are shown in Table 14 below.

TABLE 13

7th Embodiment
f = 4.71 mm, Fno = 1.65, HFOV = 45.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 4.448 (ASP) | 0.280 | Plastic | 1.545 | 56.1 | 17.89 |
| 2 | | 8.001 (ASP) | −0.025 | | | | |
| 3 | Ape. Stop | Plano | 0.234 | | | | |
| 4 | Lens 2 | 8.325 (ASP) | 0.942 | Plastic | 1.544 | 56.0 | 4.70 |
| 5 | | −3.545 (ASP) | 0.010 | | | | |
| 6 | Lens 3 | 5.210 (ASP) | 0.286 | Plastic | 1.650 | 21.8 | −8.34 |
| 7 | | 2.599 (ASP) | 0.805 | | | | |
| 8 | Lens 4 | −193.803 (ASP) | 0.301 | Plastic | 1.669 | 19.5 | −15.67 |
| 9 | | 11.087 (ASP) | 0.150 | | | | |
| 10 | Lens 5 | −5.510 (ASP) | 0.768 | Plastic | 1.544 | 56.0 | 3.88 |

TABLE 13-continued

7th Embodiment
f = 4.71 mm, Fno = 1.65, HFOV = 45.1 deg.

| Surface # | | Curvature Radius | Thickness | Material | Index | Abbe # | Focal Length |
|---|---|---|---|---|---|---|---|
| 11 | | −1.601 (ASP) | 0.010 | | | | |
| 12 | Lens 6 | 13.745 (ASP) | 0.822 | Plastic | 1.544 | 56.0 | −18.67 |
| 13 | | 5.718 (ASP) | 0.858 | | | | |
| 14 | Lens 7 | 4.316 (ASP) | 0.330 | Plastic | 1.544 | 56.0 | −5.03 |
| 15 | | 1.630 (ASP) | 0.600 | | | | |
| 16 | Filter | Plano | 0.110 | Glass | 1.517 | 64.2 | — |
| 17 | | Plano | 0.285 | | | | |
| 18 | Image | Plano | — | | | | |

Note:
Reference wavelength is 587.6 nm (d-line).
An effective radius of the image-side surface 722 (Surface 5) is 1.482 mm.

TABLE 14

Aspheric Coefficients

| | Surface # | | | | |
|---|---|---|---|---|---|
| | 1 | 2 | 4 | 5 | 6 |
| k = | −1.0742E+01 | −6.8918E+01 | 2.6373E+01 | −2.7407E+01 | 2.9202E+00 |
| A4 = | −3.1324E−02 | −3.6630E−02 | −1.3540E−02 | −4.6005E−02 | −6.5938E−02 |
| A6 = | −1.2501E−02 | −3.2419E−02 | −1.4956E−02 | 1.1695E−02 | 1.4894E−02 |
| A8 = | −8.2092E−03 | 2.0039E−02 | 1.4499E−02 | −5.2336E−03 | −9.8465E−03 |
| A10 = | 7.2927E−03 | −4.0548E−03 | −4.2798E−03 | 1.0568E−03 | 3.1072E−03 |
| A12 = | −1.1603E−03 | 4.6225E−04 | −7.0488E−06 | −1.3026E−04 | −1.7496E−04 |

| | Surface # | | | | |
|---|---|---|---|---|---|
| | 7 | 8 | 9 | 10 | 11 |
| k = | 1.6592E−01 | −8.3271E+01 | 2.4164E+00 | 1.6336E+00 | −1.0365E+00 |
| A4 = | −9.5563E−02 | −5.2837E−02 | −9.0692E−02 | −1.0895E−01 | 4.9431E−02 |
| A6 = | 5.0817E−02 | −1.3095E−02 | 2.5960E−02 | 1.4275E−01 | −2.4596E−02 |
| A8 = | −3.4387E−02 | 8.3805E−03 | −5.3248E−03 | −8.5528E−02 | 1.8198E−02 |
| A10 = | 1.3711E−02 | 2.3943E−03 | 3.0253E−03 | 2.8143E−02 | −1.1112E−02 |
| A12 = | −3.0278E−03 | −3.4608E−03 | −2.5886E−04 | −4.9242E−03 | 3.7876E−03 |
| A14 = | 2.6983E−04 | 6.7344E−04 | 7.4230E−05 | 4.0074E−04 | −6.1951E−04 |
| A16 = | — | — | — | −9.6010E−06 | 3.8811E−05 |

| | Surface # | | | |
|---|---|---|---|---|
| | 12 | 13 | 14 | 15 |
| k = | −7.8169E+01 | 1.3642E+00 | −6.1232E+00 | −4.1755E+00 |
| A4 = | 9.2778E−02 | 1.7363E−02 | −9.4956E−02 | −5.4162E−02 |
| A6 = | −6.5948E−02 | −1.1825E−02 | 1.8371E−02 | 1.2404E−02 |
| A8 = | 2.5850E−02 | 2.2607E−03 | −1.6338E−03 | −1.9748E−03 |
| A10 = | −7.2189E−03 | −2.4625E−04 | 7.2682E−05 | 2.0440E−04 |
| A12 = | 1.3099E−03 | 1.4657E−05 | −1.1893E−06 | −1.2600E−05 |
| A14 = | −1.3701E−04 | −3.6984E−07 | −1.4753E−08 | 4.1742E−07 |
| A16 = | 6.1474E−06 | 4.6708E−10 | 4.7931E−10 | −5.7256E−09 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 4.71 | f/R8 | 0.42 |
| Fno | 1.65 | f/R14 | 2.89 |
| HFOV [deg.] | 45.1 | (R3 + R4)/(R3 − R4) | 0.40 |
| V1/V4 | 2.88 | |R9/R10| | 3.44 |
| V3 + V4 | 41.2 | f/f7 | −0.94 |
| CT1/T12 | 1.34 | |f2/f1| | 0.26 |
| CT7/CT2 | 0.35 | f3/f4 | 0.53 |
| TD/(T34 + T67) | 3.47 | f5/f2 | 0.83 |
| TL [mm] | 6.77 | |f5/f3| | 0.47 |
| TL/EPD | 2.37 | f7/f6 | 0.27 |

-continued

| 7th Embodiment | | | |
|---|---|---|---|
| TL/ImgH | 1.41 | Yc62/Yc72 | 1.21 |
| f/R1 | 1.06 | — | — |

8th Embodiment

Figure 15:
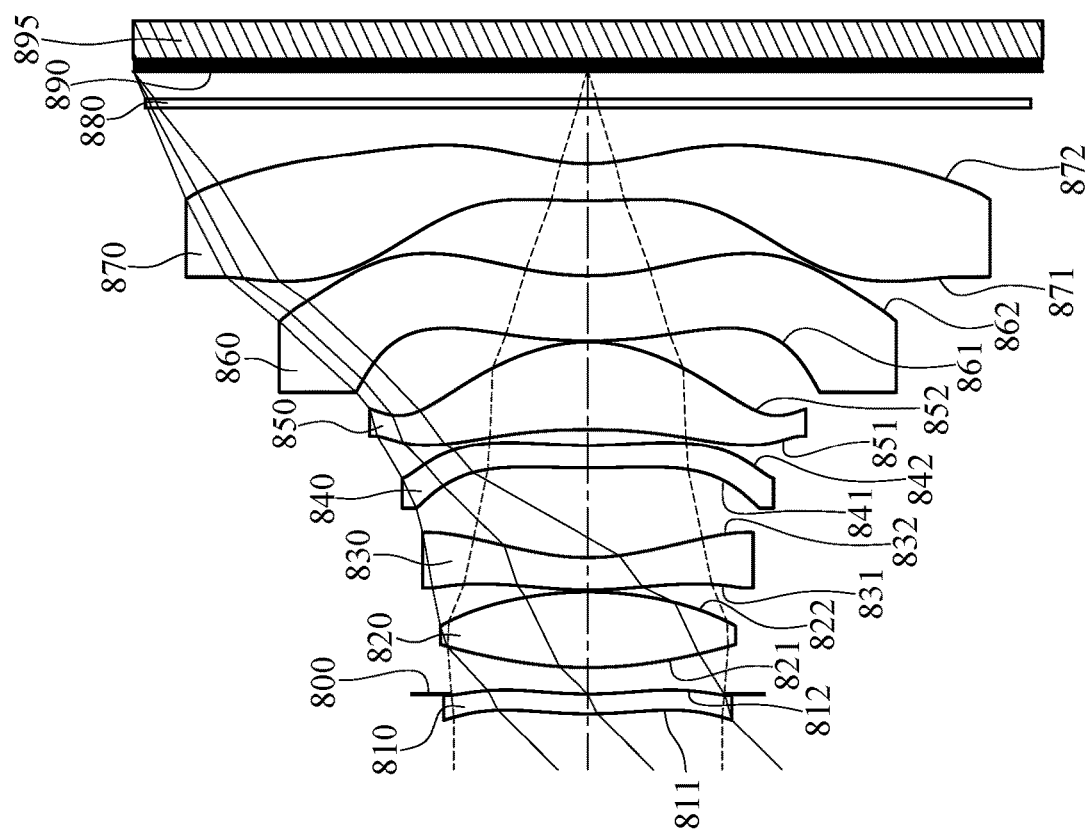
FIG. 15 is a schematic view of an image capturing unit according to the 8th embodiment of the present disclosure.
Figure 16:
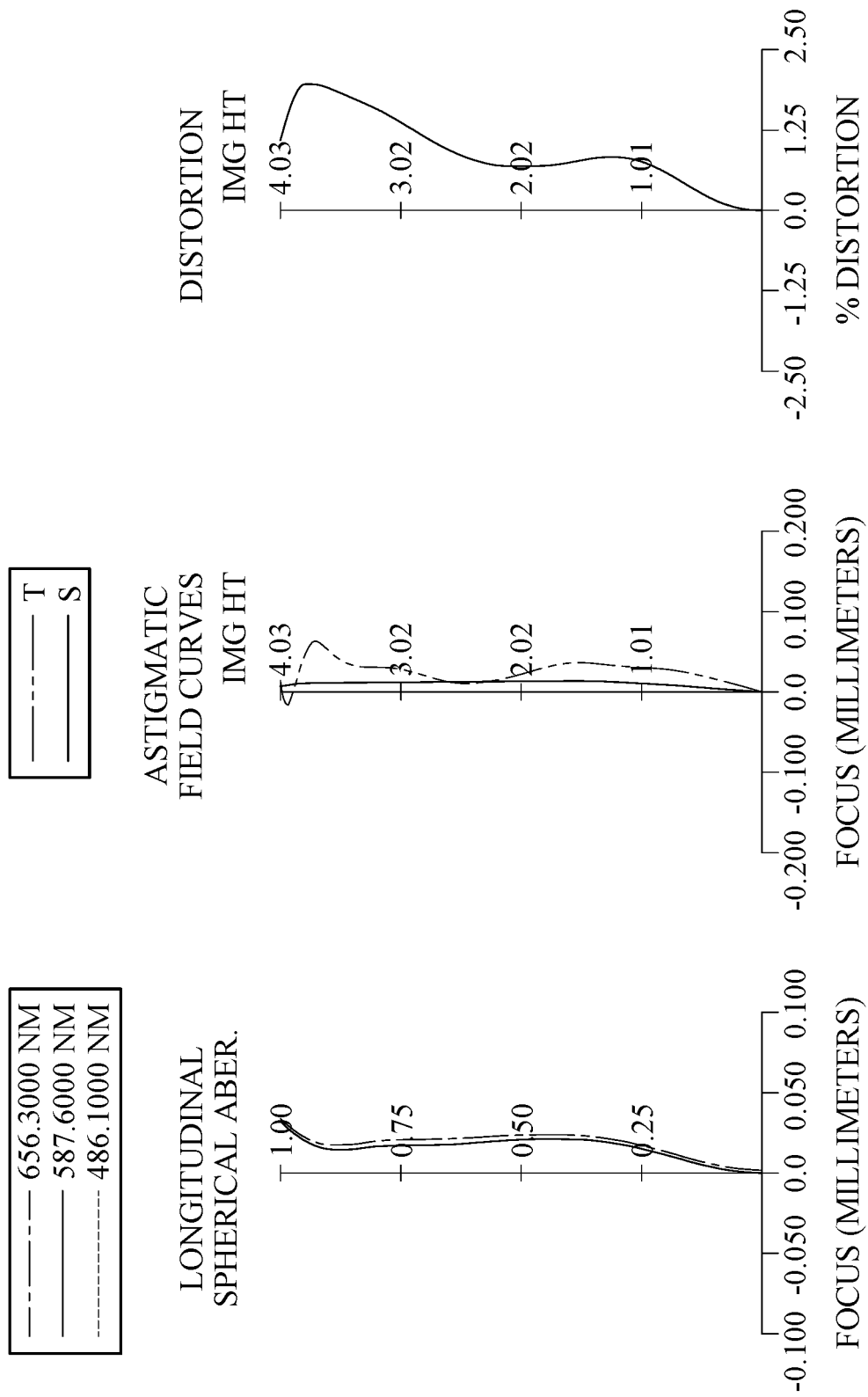
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the imaging optical lens system (its reference numeral is omitted) of the present disclosure and an image sensor 895. The imaging optical lens system includes, in order from an object side to an image side, a first lens element 810, an aperture stop 800, a second lens element 820, a third lens element 830, a fourth lens element 840, a fifth lens element 850, a sixth lens element 860, a seventh lens element 870, a filter 880 and an image surface 890. The imaging optical lens system includes seven lens elements (810, 820, 830, 840, 850, 860 and 870) with no additional lens element disposed between each of the adjacent seven lens elements.

The first lens element 810 with negative refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric. Each of the object-side surface 811 and the image-side surface 812 of the first lens element 810 has at least one critical point in an off-axis region thereof.

The second lens element 820 with positive refractive power has an object-side surface 821 being convex in a paraxial region thereof and an image-side surface 822 being convex in a paraxial region thereof. The second lens element 820 is made of plastic material and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric. Each of the object-side surface 831 and the image-side surface 832 of the third lens element 830 has at least one critical point in an off-axis region thereof.

The fourth lens element 840 with negative refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric. Each of the object-side surface 841 and the image-side surface 842 of the fourth lens element 840 has at least one critical point in an off-axis region thereof.

The fifth lens element 850 with positive refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric. Each of the object-side surface 851 and the image-side surface 852 of the fifth lens element 850 has at least one critical point in an off-axis region thereof.

The sixth lens element 860 with negative refractive power has an object-side surface 861 being convex in a paraxial region thereof and an image-side surface 862 being concave in a paraxial region thereof. The sixth lens element 860 is made of plastic material and has the object-side surface 861 and the image-side surface 862 being both aspheric. Each of the object-side surface 861 and the image-side surface 862 of the sixth lens element 860 has at least one critical point in an off-axis region thereof.

The seventh lens element 870 with negative refractive power has an object-side surface 871 being convex in a paraxial region thereof and an image-side surface 872 being concave in a paraxial region thereof. The seventh lens element 870 is made of plastic material and has the object-side surface 871 and the image-side surface 872 being both aspheric. Each of the object-side surface 871 and the image-side surface 872 of the seventh lens element 870 has at least one critical point in an off-axis region thereof.

The filter 880 is made of glass material and located between the seventh lens element 870 and the image surface 890, and will not affect the focal length of the imaging optical lens system. The image sensor 895 is disposed on or near the image surface 890 of the imaging optical lens system.

The detailed optical data of the 8th embodiment are shown in Table 15 and the aspheric surface data are shown in Table 16 below.

TABLE 15

8th Embodiment
f = 4.00 mm, Fno = 1.68, HFOV = 44.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 4.040 (ASP) | 0.175 | Plastic | 1.614 | 26.0 | −134.02 |
| 2 | | 3.788 (ASP) | −0.002 | | | | |
| 3 | Ape. Stop | Plano | 0.237 | | | | |
| 4 | Lens 2 | 3.761 (ASP) | 0.671 | Plastic | 1.544 | 56.0 | 3.21 |
| 5 | | −3.049 (ASP) | 0.018 | | | | |
| 6 | Lens 3 | 3.848 (ASP) | 0.285 | Plastic | 1.639 | 23.2 | −7.01 |
| 7 | | 2.010 (ASP) | 0.798 | | | | |
| 8 | Lens 4 | 8.279 (ASP) | 0.200 | Plastic | 1.669 | 19.5 | −13.41 |
| 9 | | 4.264 (ASP) | 0.143 | | | | |
| 10 | Lens 5 | −7.603 (ASP) | 0.777 | Plastic | 1.544 | 56.0 | 3.12 |
| 11 | | −1.438 (ASP) | 0.010 | | | | |

TABLE 15-continued

8th Embodiment
f = 4.00 mm, Fno = 1.68, HFOV = 44.8 deg.

| Surface # | | Curvature Radius | Thickness | Material | Index | Abbe # | Focal Length |
|---|---|---|---|---|---|---|---|
| 12 | Lens 6 | 4.512 (ASP) | 0.579 | Plastic | 1.566 | 37.4 | −10.17 |
| 13 | | 2.412 (ASP) | 0.662 | | | | |
| 14 | Lens 7 | 5.215 (ASP) | 0.331 | Plastic | 1.544 | 56.0 | −4.55 |
| 15 | | 1.641 (ASP) | 0.500 | | | | |
| 16 | Filter | Plano | 0.080 | Glass | 1.517 | 64.2 | — |
| 17 | | Plano | 0.243 | | | | |
| 18 | Image | Plano | — | | | | |

Note:
Reference wavelength is 587.6 nm (d-line).
An effective radius of the image-side surface 822 (Surface 5) is 1.310 mm.

TABLE 16

Aspheric Coefficients

| Surface # | | | | | |
|---|---|---|---|---|---|
| | 1 | 2 | 4 | 5 | 6 |
| k = | −1.4446E+01 | −2.7001E+01 | 4.9070E+00 | −2.8712E+01 | 3.0934E+00 |
| A4 = | −8.0094E−02 | −5.2229E−02 | −4.5638E−03 | −7.1682E−02 | −1.0077E−01 |
| A6 = | −4.4445E−02 | −1.0085E−01 | −4.8049E−02 | 2.9158E−02 | 3.5324E−03 |
| A8 = | 3.4210E−02 | 1.0305E−01 | 3.7247E−02 | −1.7712E−02 | 1.9291E−02 |
| A10 = | −5.8821E−04 | −3.3936E−02 | −1.1029E−02 | 8.4948E−03 | −1.3264E−02 |
| A12 = | −2.3488E−03 | 3.9765E−03 | 1.8266E−04 | −1.9424E−03 | 2.9749E−03 |

| Surface # | | | | | |
|---|---|---|---|---|---|
| | 7 | 8 | 9 | 10 | 11 |
| k = | 2.1580E−01 | 2.3149E+01 | 1.0937E+00 | −9.2686E+00 | −1.0032E+00 |
| A4 = | −1.4840E−01 | −1.3034E−01 | −1.9594E−01 | −1.2924E−01 | 4.2620E−02 |
| A6 = | 8.4141E−02 | 6.3647E−02 | 1.5678E−01 | 1.9629E−01 | −1.6439E−02 |
| A8 = | −6.1118E−02 | −6.3149E−02 | −1.2079E−01 | −1.5437E−01 | 7.1495E−03 |
| A10 = | 2.9305E−02 | 3.7971E−02 | 5.7319E−02 | 7.4450E−02 | −5.9939E−03 |
| A12 = | −8.8624E−03 | −1.4059E−02 | −1.6002E−02 | −2.0954E−02 | 4.5914E−03 |
| A14 = | 1.1207E−03 | 2.2734E−03 | 2.0063E−03 | 3.2127E−03 | −1.2499E−03 |
| A16 = | — | — | — | −2.1201E−04 | 1.0936E−04 |

| Surface # | | | | |
|---|---|---|---|---|
| | 12 | 13 | 14 | 15 |
| k = | −5.5195E+01 | −4.6645E−01 | −1.7607E+00 | −6.1983E+00 |
| A4 = | 8.2733E−02 | −5.9411E−02 | −1.7923E−01 | −9.1098E−02 |
| A6 = | −1.0249E−01 | −4.9103E−03 | 4.8389E−02 | 2.4806E−02 |
| A8 = | 5.5305E−02 | 4.3102E−03 | −5.4427E−03 | −3.2818E−03 |
| A10 = | −2.0459E−02 | −1.2724E−03 | 1.8574E−04 | 2.1590E−04 |
| A12 = | 4.9302E−03 | 2.0483E−04 | 1.6226E−05 | −5.6505E−06 |
| A14 = | −7.2635E−04 | −1.6169E−05 | −1.6776E−06 | −3.1175E−08 |
| A16 = | 4.8473E−05 | 4.6913E−07 | 4.3599E−08 | 2.5149E−09 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 4.00 | f/R8 | 0.94 |
| Fno | 1.68 | f/R14 | 2.44 |
| HFOV [deg.] | 44.8 | (R3 + R4)/(R3 − R4) | 0.10 |
| V1/V4 | 1.34 | |R9/R10| | 5.29 |
| V3 + V4 | 42.7 | f/f7 | −0.88 |
| CT1/T12 | 0.74 | |f2/f1| | 0.02 |
| CT7/CT2 | 0.49 | f3/f4 | 0.52 |
| TD/(T34 + T67) | 3.35 | f5/f2 | 0.97 |
| TL [mm] | 5.71 | |f5/f3| | 0.45 |
| TL/EPD | 2.40 | f7/f6 | 0.45 |

-continued

| 8th Embodiment | | | |
|---|---|---|---|
| TL/ImgH | 1.42 | Yc62/Yc72 | 1.11 |
| f/R1 | 0.99 | — | — |

9th Embodiment

Figure 17:
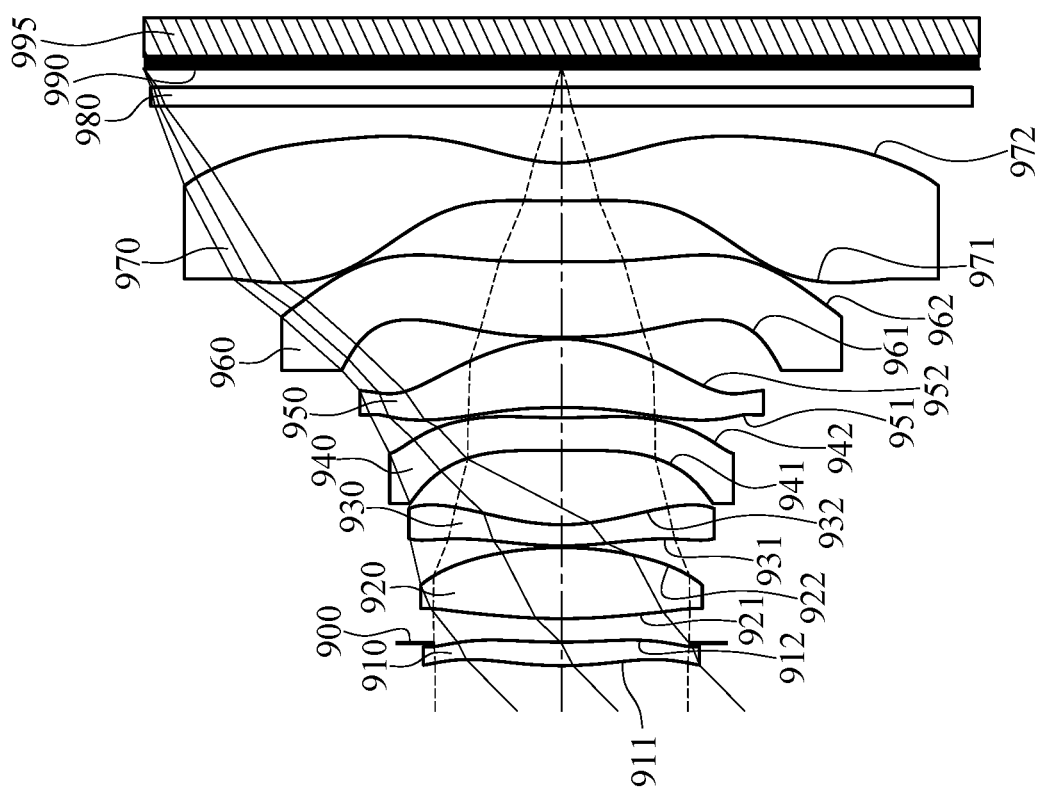
FIG. 17 is a schematic view of an image capturing unit according to the 9th embodiment of the present disclosure.
Figure 18:
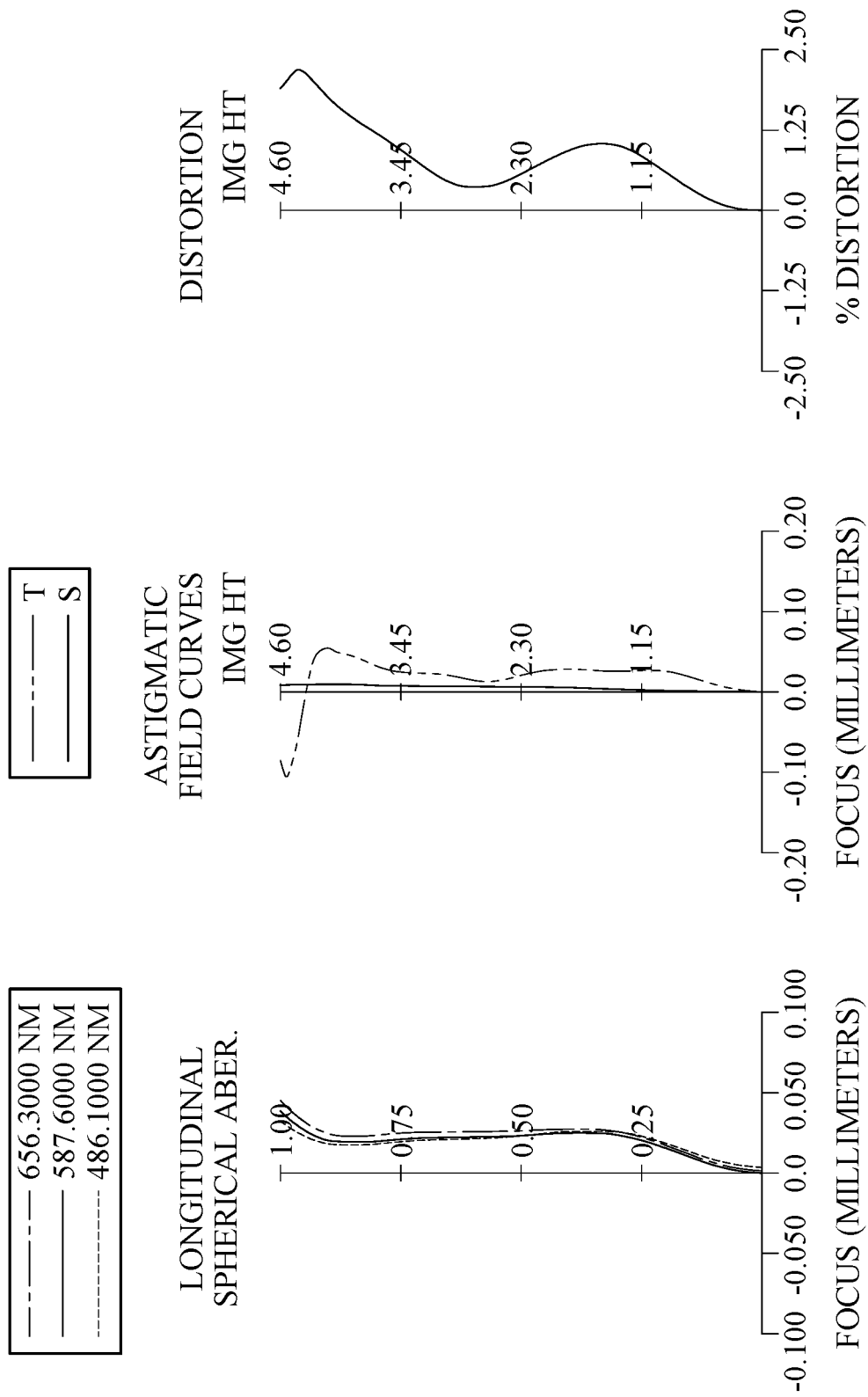
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the imaging optical lens system (its reference numeral is omitted) of the present disclosure and an image sensor 995. The imaging optical lens system includes, in order from an object side to an image side, a first lens element 910, an aperture stop 900, a second lens element 920, a third lens element 930, a fourth lens element 940, a fifth lens element 950, a sixth lens element 960, a seventh lens element 970, a filter 980 and an image surface 990. The imaging optical lens system includes seven lens elements (910, 920, 930, 940, 950, 960 and 970) with no additional lens element disposed between each of the adjacent seven lens elements.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric. Each of the object-side surface 911 and the image-side surface 912 of the first lens element 910 has at least one critical point in an off-axis region thereof.

The second lens element 920 with positive refractive power has an object-side surface 921 being convex in a paraxial region thereof and an image-side surface 922 being convex in a paraxial region thereof. The second lens element 920 is made of glass material and has the object-side surface 921 and the image-side surface 922 being both aspheric. The object-side surface 921 of the second lens element 920 has at least one critical point in an off-axis region thereof.

The third lens element 930 with negative refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric. Each of the object-side surface 931 and the image-side surface 932 of the third lens element 930 has at least one critical point in an off-axis region thereof.

The fourth lens element 940 with negative refractive power has an object-side surface 941 being concave in a paraxial region thereof and an image-side surface 942 being concave in a paraxial region thereof. The fourth lens element 940 is made of plastic material and has the object-side surface 941 and the image-side surface 942 being both aspheric. The image-side surface 942 of the fourth lens element 940 has at least one critical point in an off-axis region thereof.

The fifth lens element 950 with positive refractive power has an object-side surface 951 being concave in a paraxial region thereof and an image-side surface 952 being convex in a paraxial region thereof. The fifth lens element 950 is made of plastic material and has the object-side surface 951 and the image-side surface 952 being both aspheric. Each of the object-side surface 951 and the image-side surface 952 of the fifth lens element 950 has at least one critical point in an off-axis region thereof.

The sixth lens element 960 with positive refractive power has an object-side surface 961 being convex in a paraxial region thereof and an image-side surface 962 being convex in a paraxial region thereof. The sixth lens element 960 is made of plastic material and has the object-side surface 961 and the image-side surface 962 being both aspheric. Each of the object-side surface 961 and the image-side surface 962 of the sixth lens element 960 has at least one critical point in an off-axis region thereof.

The seventh lens element 970 with negative refractive power has an object-side surface 971 being convex in a paraxial region thereof and an image-side surface 972 being concave in a paraxial region thereof. The seventh lens element 970 is made of plastic material and has the object-side surface 971 and the image-side surface 972 being both aspheric. Each of the object-side surface 971 and the image-side surface 972 of the seventh lens element 970 has at least one critical point in an off-axis region thereof.

The filter 980 is made of glass material and located between the seventh lens element 970 and the image surface 990, and will not affect the focal length of the imaging optical lens system. The image sensor 995 is disposed on or near the image surface 990 of the imaging optical lens system.

The detailed optical data of the 9th embodiment are shown in Table 17 and the aspheric surface data are shown in Table 18 below.

TABLE 17

9th Embodiment
f = 4.59 mm, Fno = 1.65, HFOV = 44.4 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 3.978 (ASP) | 0.260 | Plastic | 1.544 | 56.0 | 17.70 |
| 2 | | 6.620 (ASP) | −0.009 | | | | |
| 3 | Ape. Stop | Plano | 0.268 | | | | |
| 4 | Lens 2 | 6.490 (ASP) | 0.783 | Glass | 1.518 | 63.5 | 4.67 |
| 5 | | −3.691 (ASP) | 0.020 | | | | |
| 6 | Lens 3 | 3.717 (ASP) | 0.232 | Plastic | 1.614 | 26.0 | −8.96 |
| 7 | | 2.165 (ASP) | 0.822 | | | | |
| 8 | Lens 4 | −193.424 (ASP) | 0.358 | Plastic | 1.688 | 18.7 | −10.29 |
| 9 | | 7.356 (ASP) | 0.112 | | | | |
| 10 | Lens 5 | −7.500 (ASP) | 0.756 | Plastic | 1.544 | 56.0 | 4.52 |

TABLE 17-continued

9th Embodiment
f = 4.59 mm, Fno = 1.65, HFOV = 44.4 deg.

| Surface # | | Curvature Radius | Thickness | Material | Index | Abbe # | Focal Length |
|---|---|---|---|---|---|---|---|
| 11 | | −1.919 (ASP) | 0.020 | | | | |
| 12 | Lens 6 | 9.086 (ASP) | 0.832 | Plastic | 1.529 | 45.4 | 16.44 |
| 13 | | −198.807 (ASP) | 0.670 | | | | |
| 14 | Lens 7 | 12.957 (ASP) | 0.418 | Plastic | 1.544 | 56.0 | −3.73 |
| 15 | | 1.733 (ASP) | 0.625 | | | | |
| 16 | Filter | Plano | 0.210 | Glass | 1.517 | 64.2 | — |
| 17 | | Plano | 0.203 | | | | |
| 18 | Image | Plano | — | | | | |

Note:
Reference wavelength is 587.6 nm (d-line).
An effective radius of the image-side surface 922 (Surface 5) is 1.550 mm.

TABLE 18

Aspheric Coefficients

| | | | Surface # | | |
|---|---|---|---|---|---|
| | 1 | 2 | 4 | 5 | 6 |
| k = | −6.8209E+00 | −3.2451E+01 | 4.5615E+00 | −2.8423E+01 | 3.6251E−01 |
| A4 = | −3.5103E−02 | −4.2803E−02 | −1.4965E−02 | −4.9385E−02 | −9.2112E−02 |
| A6 = | −7.3504E−03 | −2.1263E−02 | −1.4983E−02 | 1.9380E−02 | 4.8797E−02 |
| A8 = | −1.3023E−02 | 1.1972E−02 | 1.9085E−02 | −1.1620E−02 | −2.9352E−02 |
| A10 = | 1.0265E−02 | −3.2305E−04 | −6.8504E−03 | 3.7802E−03 | 8.7826E−03 |
| A12 = | −1.7466E−03 | −1.2862E−04 | 5.8713E−04 | −6.3336E−04 | −8.0274E−04 |

| | | | Surface # | | |
|---|---|---|---|---|---|
| | 7 | 8 | 9 | 10 | 11 |
| k = | −5.5884E−01 | 9.9000E+01 | 2.7398E+00 | −3.8271E+00 | −9.6910E−01 |
| A4 = | −1.2075E−01 | −7.6767E−02 | −1.1464E−01 | −9.3687E−02 | 2.8674E−02 |
| A6 = | 7.7638E−02 | −3.9806E−03 | 4.1528E−02 | 1.2693E−01 | −1.7190E−02 |
| A8 = | −4.9437E−02 | 4.4068E−03 | −1.4685E−02 | −7.8466E−02 | 1.6457E−02 |
| A10 = | 1.8111E−02 | 2.6464E−03 | 4.6073E−03 | 2.9150E−02 | −9.8477E−03 |
| A12 = | −3.5761E−03 | −2.7067E−03 | −1.2033E−03 | −6.4647E−03 | 3.3895E−03 |
| A14 = | 2.7612E−04 | 5.0275E−04 | 1.5165E−04 | 8.0167E−04 | −5.6010E−04 |
| A16 = | — | — | — | −4.3746E−05 | 3.4477E−05 |

| | | Surface # | | |
|---|---|---|---|---|
| | 12 | 13 | 14 | 15 |
| k = | −7.2960E+01 | −9.9000E+01 | 2.6953E−01 | −4.2104E+00 |
| A4 = | 9.5290E−02 | 6.3117E−02 | −7.8096E−02 | −5.6229E−02 |
| A6 = | −7.6233E−02 | −3.3929E−02 | 4.3624E−03 | 1.3630E−02 |
| A8 = | 3.8870E−02 | 6.9275E−03 | 2.3133E−03 | −2.4555E−03 |
| A10 = | −1.7064E−02 | −3.4749E−04 | −3.5027E−04 | 3.6333E−04 |
| A12 = | 5.9160E−03 | −1.7081E−04 | −3.0526E−06 | −3.9527E−05 |
| A14 = | −1.4622E−03 | 4.6338E−05 | 4.5957E−06 | 2.8273E−06 |
| A16 = | 2.3334E−04 | −5.4473E−06 | −4.3907E−07 | −1.2352E−07 |
| A18 = | −2.1323E−05 | 3.2316E−07 | 1.7830E−08 | 2.9833E−09 |
| A20 = | 8.4346E−07 | −7.8589E−09 | −2.7804E−10 | −3.0633E−11 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 4.59 | f/R8 | 0.62 |
| Fno | 1.65 | f/R14 | 2.65 |
| HFOV [deg.] | 44.4 | (R3 + R4)/(R3 − R4) | 0.27 |
| V1/V4 | 2.99 | |R9/R10| | 3.91 |
| V3 + V4 | 44.7 | f/f7 | −1.23 |
| CT1/T12 | 1.00 | |f2/f1| | 0.26 |
| CT7/CT2 | 0.53 | f3/f4 | 0.87 |
| TD/(T34 + T67) | 3.71 | f5/f2 | 0.97 |
| TL [mm] | 6.58 | |f5/f3| | 0.50 |

-continued

| 9th Embodiment | | | |
|---|---|---|---|
| TL/EPD | 2.36 | f7/f6 | −0.23 |
| TL/ImgH | 1.43 | Yc62/Yc72 | 0.08 and 0.86 |
| f/R1 | 1.15 | — | — |

10th Embodiment

Figure 19:
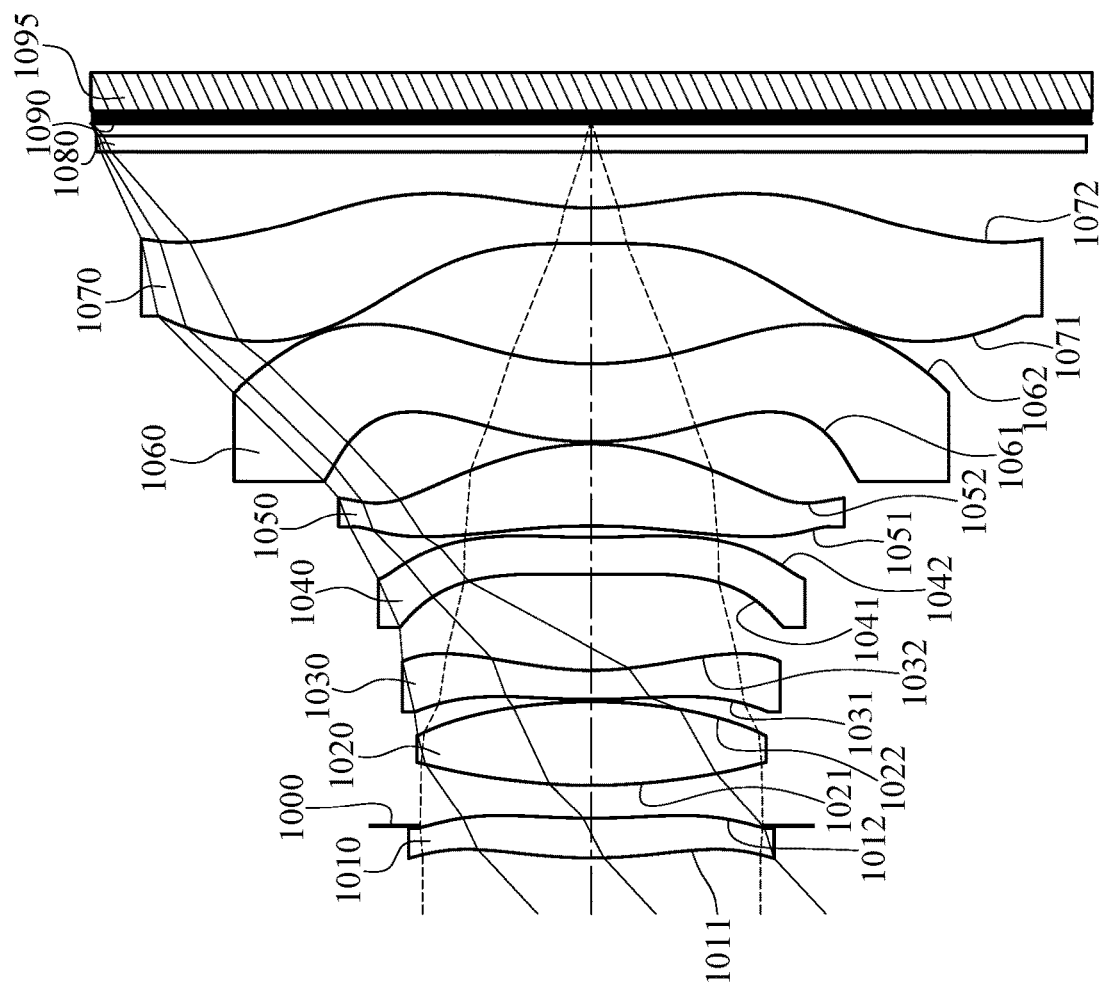
FIG. 19 is a schematic view of an image capturing unit according to the 10th embodiment of the present disclosure.
Figure 20:
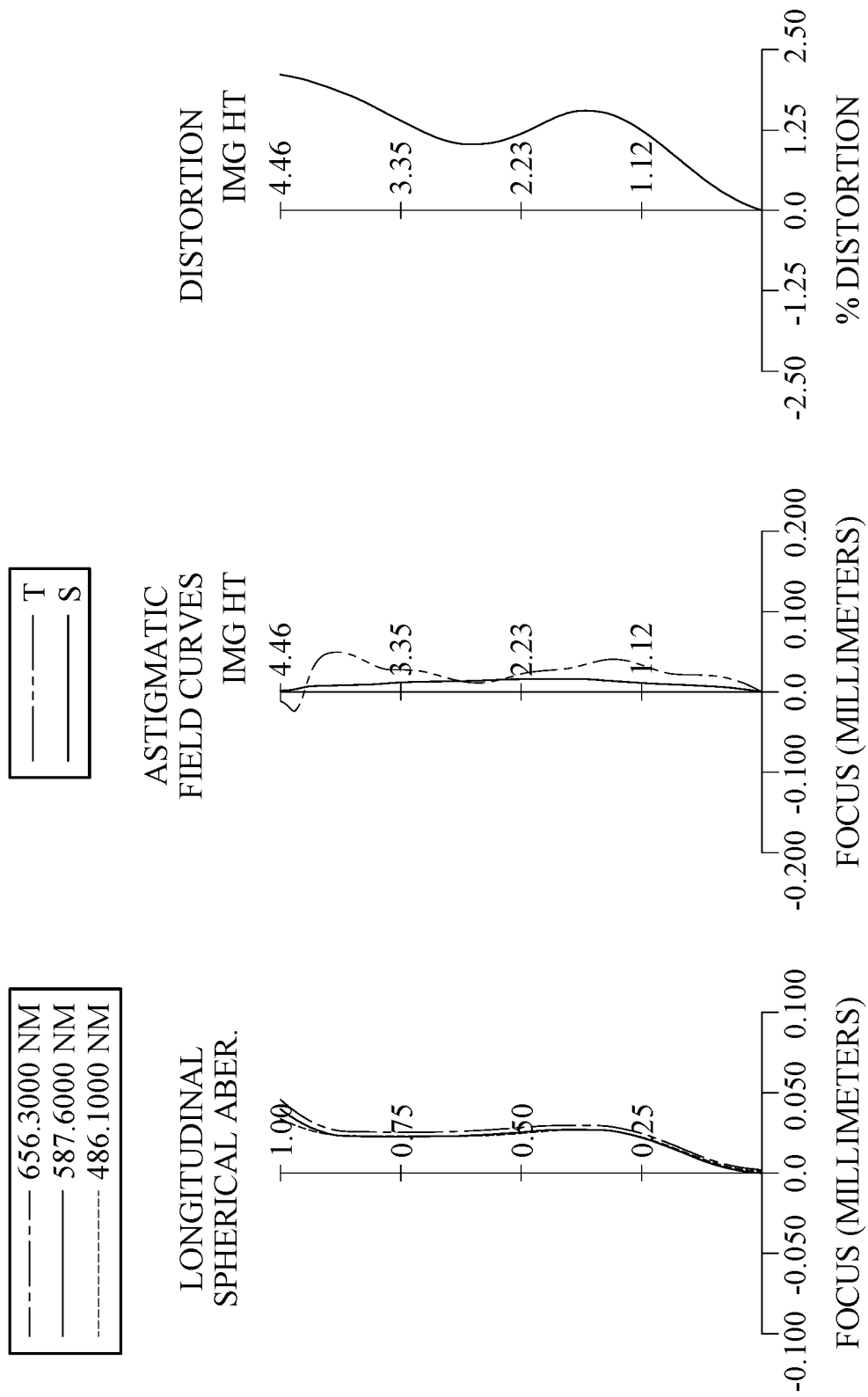
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the imaging optical lens system (its reference numeral is omitted) of the present disclosure and an image sensor 1095. The imaging optical lens system includes, in order from an object side to an image side, a first lens element 1010, an aperture stop 1000, a second lens element 1020, a third lens element 1030, a fourth lens element 1040, a fifth lens element 1050, a sixth lens element 1060, a seventh lens element 1070, a filter 1080 and an image surface 1090. The imaging optical lens system includes seven lens elements (1010, 1020, 1030, 1040, 1050, 1060 and 1070) with no additional lens element disposed between each of the adjacent seven lens elements.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric. Each of the object-side surface 1011 and the image-side surface 1012 of the first lens element 1010 has at least one critical point in an off-axis region thereof.

The second lens element 1020 with positive refractive power has an object-side surface 1021 being convex in a paraxial region thereof and an image-side surface 1022 being convex in a paraxial region thereof. The second lens element 1020 is made of plastic material and has the object-side surface 1021 and the image-side surface 1022 being both aspheric.

The third lens element 1030 with negative refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric. Each of the object-side surface 1031 and the image-side surface 1032 of the third lens element 1030 has at least one critical point in an off-axis region thereof.

The fourth lens element 1040 with negative refractive power has an object-side surface 1041 being convex in a paraxial region thereof and an image-side surface 1042 being concave in a paraxial region thereof. The fourth lens element 1040 is made of plastic material and has the object-side surface 1041 and the image-side surface 1042 being both aspheric. Each of the object-side surface 1041 and the image-side surface 1042 of the fourth lens element 1040 has at least one critical point in an off-axis region thereof.

The fifth lens element 1050 with positive refractive power has an object-side surface 1051 being concave in a paraxial region thereof and an image-side surface 1052 being convex in a paraxial region thereof. The fifth lens element 1050 is made of plastic material and has the object-side surface 1051 and the image-side surface 1052 being both aspheric. Each of the object-side surface 1051 and the image-side surface 1052 of the fifth lens element 1050 has at least one critical point in an off-axis region thereof.

The sixth lens element 1060 with positive refractive power has an object-side surface 1061 being convex in a paraxial region thereof and an image-side surface 1062 being concave in a paraxial region thereof. The sixth lens element 1060 is made of plastic material and has the object-side surface 1061 and the image-side surface 1062 being both aspheric. Each of the object-side surface 1061 and the image-side surface 1062 of the sixth lens element 1060 has at least one critical point in an off-axis region thereof.

The seventh lens element 1070 with negative refractive power has an object-side surface 1071 being concave in a paraxial region thereof and an image-side surface 1072 being concave in a paraxial region thereof. The seventh lens element 1070 is made of plastic material and has the object-side surface 1071 and the image-side surface 1072 being both aspheric. Each of the object-side surface 1071 and the image-side surface 1072 of the seventh lens element 1070 has at least one critical point in an off-axis region thereof.

The filter 1080 is made of glass material and located between the seventh lens element 1070 and the image surface 1090, and will not affect the focal length of the imaging optical lens system. The image sensor 1095 is disposed on or near the image surface 1090 of the imaging optical lens system.

The detailed optical data of the 10th embodiment are shown in Table 19 and the aspheric surface data are shown in Table 20 below.

TABLE 19

10th Embodiment
f = 4.67 mm, Fno = 1.55, HFOV = 42.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 4.251 (ASP) | 0.356 | Plastic | 1.545 | 56.1 | 18.60 |
| 2 | | 7.106 (ASP) | −0.069 | | | | |
| 3 | Ape. Stop | Plano | 0.367 | | | | |
| 4 | Lens 2 | 5.129 (ASP) | 0.746 | Plastic | 1.544 | 56.0 | 4.50 |
| 5 | | −4.453 (ASP) | 0.020 | | | | |
| 6 | Lens 3 | 6.150 (ASP) | 0.259 | Plastic | 1.639 | 23.2 | −7.27 |
| 7 | | 2.601 (ASP) | 0.855 | | | | |
| 8 | Lens 4 | 16.356 (ASP) | 0.332 | Plastic | 1.688 | 18.7 | −17.09 |

TABLE 19-continued

10th Embodiment
f = 4.67 mm, Fno = 1.55, HFOV = 42.9 deg.

| Surface # |        | Curvature Radius |       | Thickness | Material | Index | Abbe # | Focal Length |
|-----------|--------|------------------|-------|-----------|----------|-------|--------|--------------|
| 9         |        | 6.783            | (ASP) | 0.101     |          |       |        |              |
| 10        | Lens 5 | −6.477           | (ASP) | 0.736     | Plastic  | 1.544 | 56.0   | 5.38         |
| 11        |        | −2.097           | (ASP) | 0.020     |          |       |        |              |
| 12        | Lens 6 | 3.034            | (ASP) | 0.696     | Plastic  | 1.544 | 56.0   | 84.12        |
| 13        |        | 2.987            | (ASP) | 1.075     |          |       |        |              |
| 14        | Lens 7 | −29.828          | (ASP) | 0.319     | Plastic  | 1.544 | 56.0   | −4.79        |
| 15        |        | 2.867            | (ASP) | 0.500     |          |       |        |              |
| 16        | Filter | Plano            |       | 0.145     | Glass    | 1.517 | 64.2   | —            |
| 17        |        | Plano            |       | 0.110     |          |       |        |              |
| 18        | Image  | Plano            |       | —         |          |       |        |              |

Note:
Reference wavelength is 587.6 nm (d-line).
An effective radius of the image-side surface 1022 (Surface 5) is 1.550 mm.

TABLE 20

Aspheric Coefficients

| Surface # | 1 | 2 | 4 | 5 | 6 |
|---|---|---|---|---|---|
| k = | −4.1439E+00 | −2.5905E+01 | 4.8721E+00 | −4.4123E+01 | −5.9824E−01 |
| A4 = | −3.0608E−02 | −4.0059E−02 | −1.2351E−02 | −3.0973E−02 | −7.7867E−02 |
| A6 = | −5.3955E−03 | −1.4047E−02 | −1.3077E−02 | 2.2930E−03 | 2.5736E−02 |
| A8 = | −4.6425E−03 | 8.8689E−03 | 1.1978E−02 | 1.0483E−03 | −1.1944E−02 |
| A10 = | 3.0873E−03 | −1.4920E−03 | −3.1136E−03 | −5.3118E−04 | 2.9195E−03 |
| A12 = | −4.1775E−04 | 1.1930E−04 | 1.4974E−04 | 3.0707E−05 | −2.0910E−04 |

| Surface # | 7 | 8 | 9 | 10 | 11 |
|---|---|---|---|---|---|
| k = | −4.8290E−01 | 7.0052E+01 | 2.7943E+00 | −2.4857E+01 | −9.7010E−01 |
| A4 = | −1.0953E−01 | −8.9510E−02 | −1.2326E−01 | −3.0222E−02 | 5.3401E−02 |
| A6 = | 6.4711E−02 | 2.5695E−02 | 6.2604E−02 | 6.4161E−02 | −3.2959E−02 |
| A8 = | −4.0644E−02 | −1.1661E−02 | −2.9171E−02 | −4.7932E−02 | 1.9556E−02 |
| A10 = | 1.5187E−02 | 5.5146E−03 | 9.2676E−03 | 1.9854E−02 | −9.1264E−03 |
| A12 = | −3.1642E−03 | −2.4634E−03 | −1.9159E−03 | −4.6294E−03 | 2.8048E−03 |
| A14 = | 2.6829E−04 | 4.0650E−04 | 1.8896E−04 | 5.8145E−04 | −4.3548E−04 |
| A16 = | — | — | — | −3.1320E−05 | 2.5594E−05 |

| Surface # | 12 | 13 | 14 | 15 |
|---|---|---|---|---|
| k = | −2.4499E+01 | −1.6397E+01 | −7.7902E+01 | −3.7066E+00 |
| A4 = | 1.1469E−01 | 5.0717E−02 | −8.8182E−02 | −7.2910E−02 |
| A6 = | −1.2585E−01 | −3.0087E−02 | 2.2284E−02 | 2.3066E−02 |
| A8 = | 8.5600E−02 | 8.1997E−03 | −2.9985E−03 | −5.9068E−03 |
| A10 = | −4.3985E−02 | −1.5818E−03 | 3.2743E−04 | 1.0596E−03 |
| A12 = | 1.5795E−02 | 2.3103E−04 | −3.3299E−05 | −1.2122E−04 |
| A14 = | −3.8095E−03 | −2.5618E−05 | 2.6832E−06 | 8.6304E−06 |
| A16 = | 5.8685E−04 | 2.0154E−06 | −1.4135E−07 | −3.7042E−07 |
| A18 = | −5.2219E−05 | −9.6313E−08 | 4.1791E−09 | 8.7840E−09 |
| A20 = | 2.0411E−06 | 2.0253E−09 | −5.2395E−11 | −8.8586E−11 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 4.67 | f/R8 | 0.69 |
| Fno | 1.55 | f/R14 | 1.63 |
| HFOV [deg.] | 42.9 | (R3 + R4)/(R3 − R4) | 0.07 |
| V1/V4 | 3.00 | |R9/R10| | 3.09 |
| V3 + V4 | 41.9 | f/f7 | −0.97 |
| CT1/T12 | 1.19 | |f2/f1| | 0.24 |
| CT7/CT2 | 0.43 | f3/f4 | 0.43 |

-continued

| 10th Embodiment | | | | |
|---|---|---|---|---|
| TD/(T34 + T67) | 3.01 | f5/f2 | | 1.19 |
| TL [mm] | 6.57 | |f5/f3| | | 0.74 |
| TL/EPD | 2.18 | f7/f6 | | −0.06 |
| TL/ImgH | 1.47 | Yc62/Yc72 | | 0.53 and 1.41 |
| f/R1 | 1.10 | — | | — |

11th Embodiment

Figure 21:
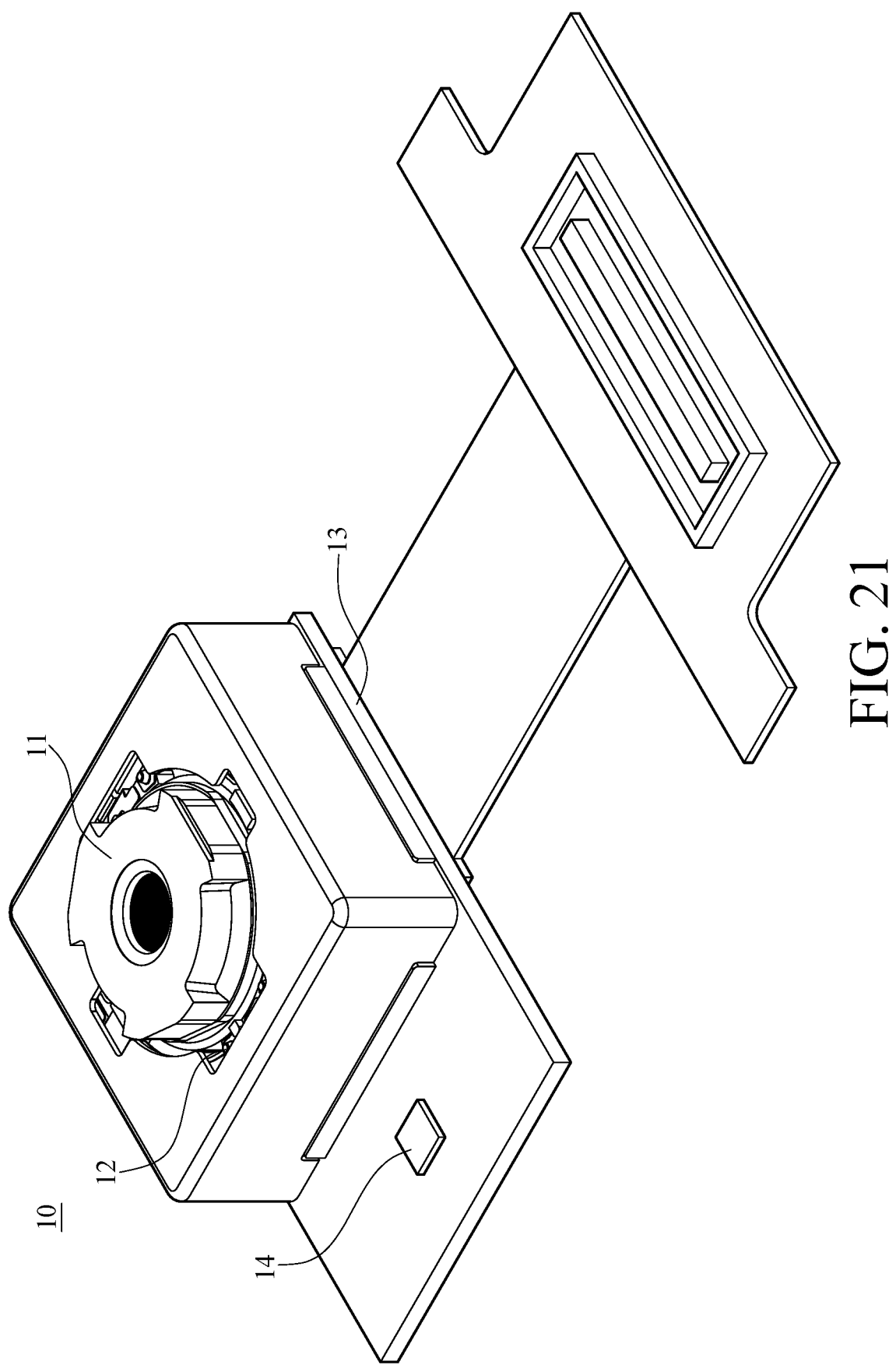
FIG. 21 is a perspective view of an image capturing unit according to the 11th embodiment of the present disclosure.

FIG. 21 is a perspective view of an image capturing unit according to the 11th embodiment of the present disclosure. In this embodiment, an image capturing unit 10 is a camera module including a lens unit 11, a driving device 12, an image sensor 13 and an image stabilizer 14. The lens unit 11 includes the imaging optical lens system disclosed in the 1st embodiment, a barrel and a holder member (their reference numerals are omitted) for holding the imaging optical lens system. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the imaging optical lens system to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

12th Embodiment

Figure 22:
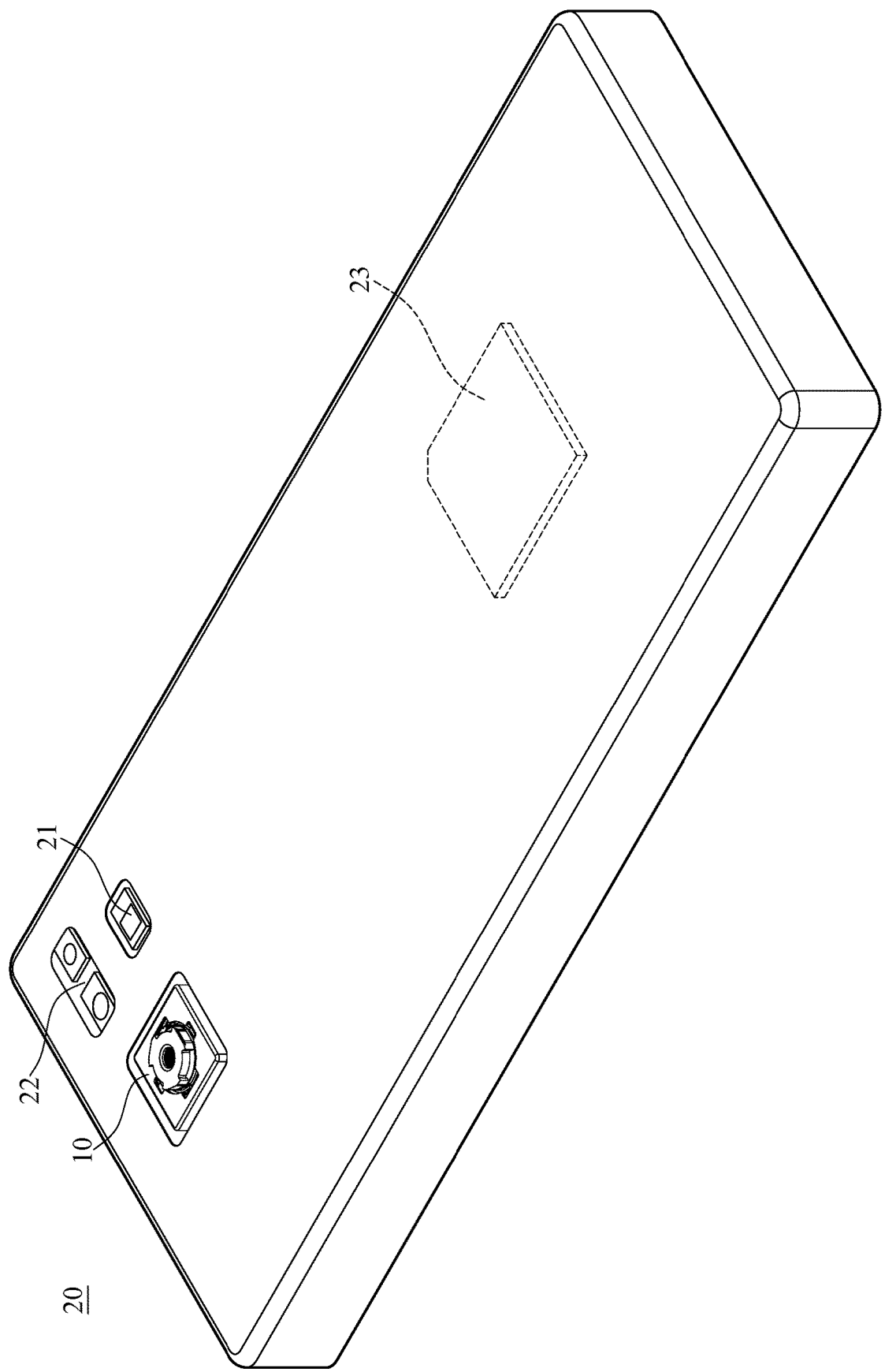
FIG. 22 is one perspective view of an electronic device according to the 12th embodiment of the present disclosure.
Figure 23:
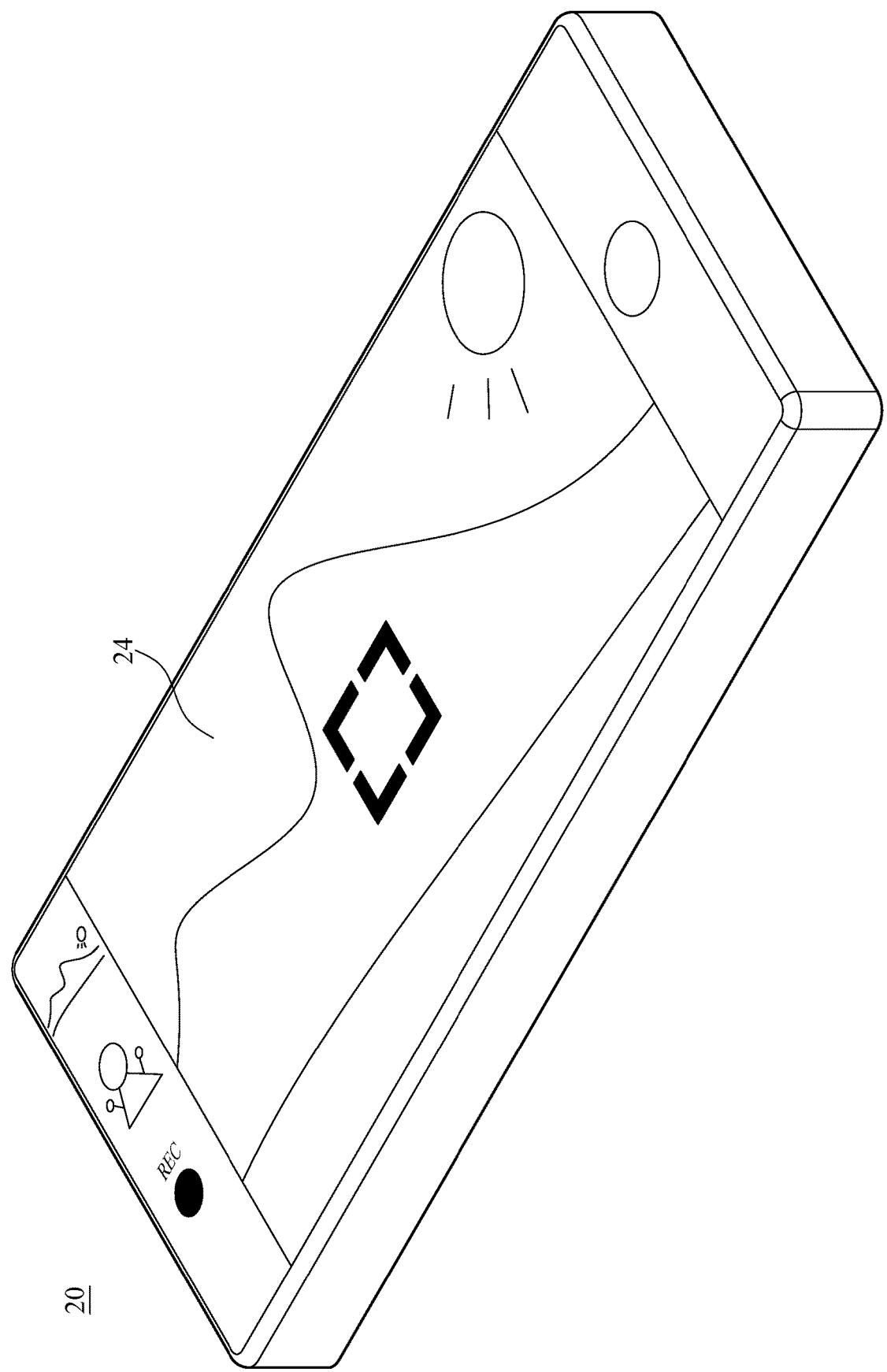
FIG. 23 is another perspective view of the electronic device in FIG. 22.
Figure 24:
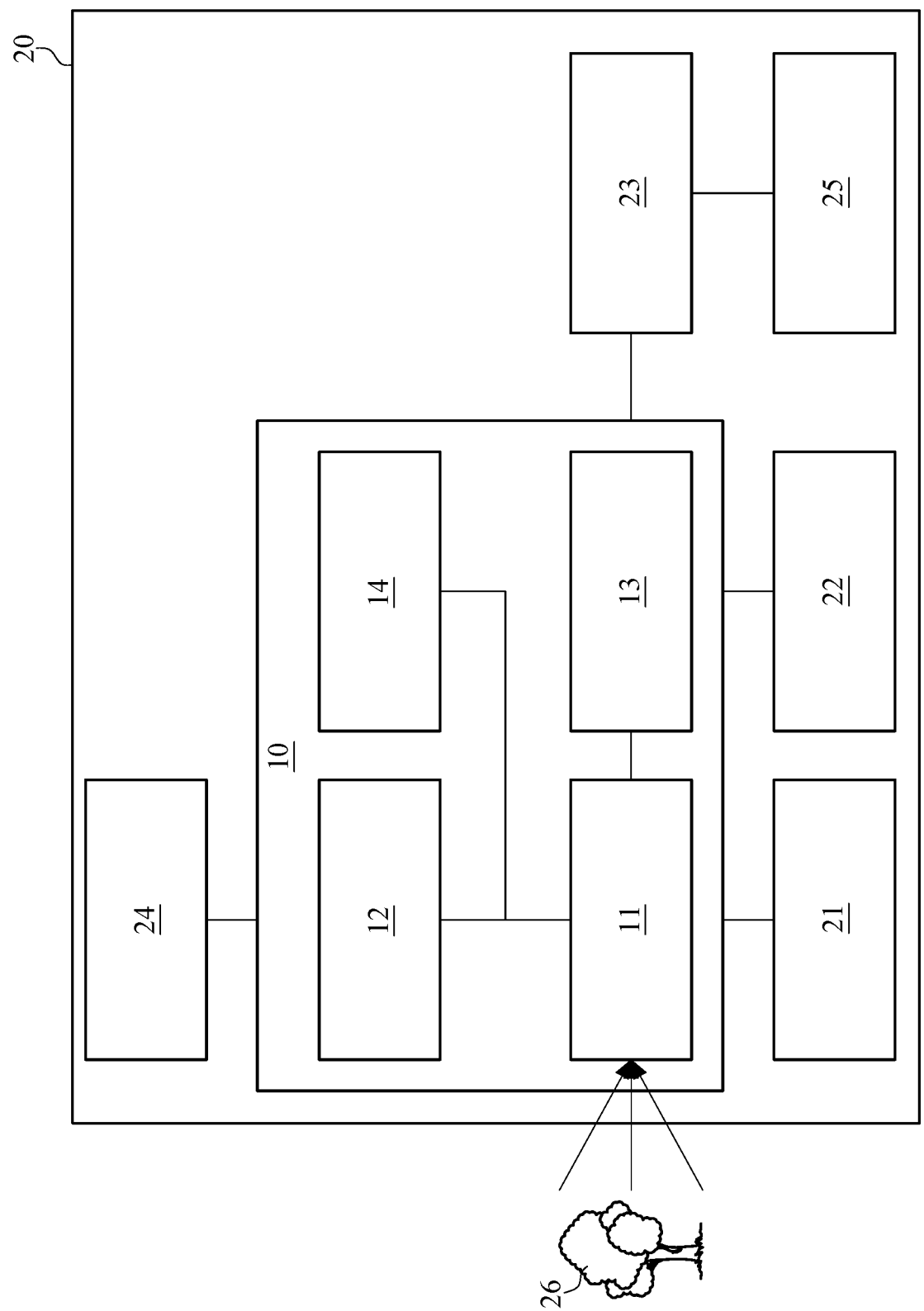
FIG. 24 is a block diagram of the electronic device in FIG. 22.

FIG. 22 is one perspective view of an electronic device according to the 12th embodiment of the present disclosure. FIG. 23 is another perspective view of the electronic device in FIG. 22. FIG. 24 is a block diagram of the electronic device in FIG. 22. In this embodiment, an electronic device 20 is a smartphone including the image capturing unit 10 disclosed in the 11th embodiment, a flash module 21, a focus assist module 22, an image signal processor 23, a user interface 24 and an image software processor 25. In this embodiment, the electronic device 20 includes one image capturing unit 10, but the disclosure is not limited thereto. In some cases, the electronic device 20 can include multiple image capturing units 10, or the electronic device 20 further includes another different image capturing unit.

When a user captures images of an object 26 through the user interface 24, the light rays converge in the image capturing unit 10 to generate an image, and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing.

The smartphone in this embodiment is only exemplary for showing the image capturing unit 10 of the present disclosure installed in an electronic device, and the disclosure is not limited thereto. The image capturing unit 10 can be optionally applied to optical systems with a movable focus. Furthermore, the imaging optical lens system of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens system comprising seven lens elements, the seven lens elements being, in order from an object side to an image side, a first lens element, a second lens element, a third lens element, a fourth lens element, a fifth lens element, a sixth lens element and a seventh lens element; each of the seven lens elements having an object-side surface facing toward the object side and an image-side surface facing toward the image side, the object-side surface of the first lens element being convex in a paraxial region thereof, the second lens element having positive refractive power, and the third lens element having negative refractive power;

wherein at least one surface among the object-side surfaces and the image-side surfaces of the seven lens elements has at least one critical point in an off-axis region thereof, an Abbe number of the first lens element is V1, an Abbe number of the fourth lens element is V4, a curvature radius of the object-side surface of the second lens element is R3, a curvature radius of the image-side surface of the second lens element is R4, a focal length of the first lens element is f1, a focal length of the second lens element is f2, and the following conditions are satisfied:

$1.20 < V1/V4 < 5.50;$ $0.10 < (R3+R4)/(R3-R4);$ and $|f2/f1| < 3.00.$

2. The imaging optical lens system of claim 1, wherein the focal length of the first lens element is f1, the focal length of the second lens element is f2, and the following condition is satisfied:

$|f2/f1|<0.80.$

3. The imaging optical lens system of claim 1, wherein a curvature radius of the object-side surface of the fifth lens element is R9, a curvature radius of the image-side surface of the fifth lens element is R10, and the following condition is satisfied:

$1.50<|R9/R10|.$

4. The imaging optical lens system of claim 1, wherein an Abbe number of the third lens element is V3, the Abbe number of the fourth lens element is V4, and the following condition is satisfied:

$10.0<V3+V4<65.0.$

5. The imaging optical lens system of claim 1, wherein a central thickness of the second lens element is CT2, a central thickness of the seventh lens element is CT7, and the following condition is satisfied:

$0<CT7/CT2<1.20.$

6. The imaging optical lens system of claim 1, wherein a focal length of the imaging optical lens system is f, a curvature radius of the image-side surface of the fourth lens element is R8, and the following condition is satisfied:

$0 \leq f/R8.$

7. The imaging optical lens system of claim 1, wherein a focal length of the third lens element is f3, a focal length of the fourth lens element is f4, and the following condition is satisfied:

$0 \leq f3/f4<1.0.$

8. The imaging optical lens system of claim 1, wherein an axial distance between the object-side surface of the first lens element and an image surface is TL, an entrance pupil diameter of the imaging optical lens system is EPD, half of a maximum field of view of the imaging optical lens system is HFOV, and the following conditions are satisfied:

$1.0 \text{ [mm]}<TL<7.0 \text{ [mm]};$ $0.8<TL/EPD<2.6;$ and $25.0 \text{ [deg.]}<HFOV<75.0 \text{ [deg.]}.$ 9. The imaging optical lens system of claim 1, wherein the image-side surface of the third lens element is concave in a paraxial region thereof, and the image-side surface of the third lens element has at least one critical point in an off-axis region thereof.

10. The imaging optical lens system of claim 1, wherein the fifth lens element has positive refractive power, the object-side surface of the fifth lens element is concave in a paraxial region thereof, and the image-side surface of the fifth lens element is convex in a paraxial region thereof.

11. The imaging optical lens system of claim 1, wherein the image-side surface of the sixth lens element has at least one critical point in an off-axis region thereof, the image-side surface of the seventh lens element has at least one critical point in an off-axis region thereof, a vertical distance between the at least one critical point on the image-side surface of the sixth lens element and an optical axis is Yc62, a vertical distance between the at least one critical point on the image-side surface of the seventh lens element and the optical axis is Yc72, and the following condition is satisfied:

$0<Yc62/Yc72<2.0.$

12. The imaging optical lens system of claim 1, wherein the seventh lens element has negative refractive power, the image-side surface of the seventh lens element is concave in a paraxial region thereof, the image-side surface of the seventh lens element has at least one critical point in an off-axis region thereof, a focal length of the imaging optical lens system is f, a focal length of the seventh lens element is f7, and the following condition is satisfied:

$-1.35<f/f7<-0.75.$

13. The imaging optical lens system of claim 1, wherein the object-side surface of the seventh lens element is convex in a paraxial region thereof.

14. An image capturing unit, comprising:

the imaging optical lens system of claim 1; and an image sensor disposed on an image surface of the imaging optical lens system.

15. An electronic device, comprising:

the image capturing unit of claim 14.

* * * * *